(12) United States Patent
Jameson et al.

(10) Patent No.: US 11,537,754 B1
(45) Date of Patent: Dec. 27, 2022

(54) PSEUDO PHYSICALLY UNCLONABLE FUNCTIONS (PUFS) USING ONE OR MORE ADDRESSABLE ARRAYS OF ELEMENTS HAVING RANDOM/PSEUDO-RANDOM VALUES

(71) Applicant: Adesto Technologies Corporation, Santa Clara, CA (US)

(72) Inventors: John R. Jameson, Menlo Park, CA (US); David Kim, Sunnyvale, CA (US); Foroozan Sarah Koushan, San Jose, CA (US)

(73) Assignee: Adesto Technologies Corporation, Santa Clara, CA (US)

( * ) Notice: Subject to any disclaimer, the term of this patent is extended or adjusted under 35 U.S.C. 154(b) by 430 days.

(21) Appl. No.: 16/571,051

(22) Filed: Sep. 13, 2019

Related U.S. Application Data

(60) Provisional application No. 62/805,874, filed on Feb. 14, 2019, provisional application No. 62/732,995, filed on Sep. 18, 2018.

(51) Int. Cl.
| | |
|---|---|
| *G06F 21/75* | (2013.01) |
| *H04L 9/32* | (2006.01) |
| *G06F 21/72* | (2013.01) |
| *G11C 13/00* | (2006.01) |
| *G06F 7/58* | (2006.01) |
| *G11C 11/16* | (2006.01) |

(52) U.S. Cl.
CPC .............. *G06F 21/75* (2013.01); *G06F 7/588* (2013.01); *G06F 21/72* (2013.01); *G11C 13/003* (2013.01); *G11C 13/004* (2013.01); *G11C 13/0023* (2013.01); *H04L 9/3278* (2013.01); *G11C 11/1659* (2013.01); *G11C 13/0004* (2013.01)

(58) Field of Classification Search
CPC .......... G06F 21/72; G06F 21/75; G06F 7/588; H04L 9/3278
See application file for complete search history.

(56) References Cited

U.S. PATENT DOCUMENTS

| | | |
|---|---|---|
| 8,654,561 B1 | 2/2014 | Jameson et al. |
| 8,976,568 B1 | 3/2015 | Jameson et al. |
| 9,165,648 B1 | 10/2015 | Jameson |
| 9,361,975 B2 | 6/2016 | Gilbert et al. |
| 9,934,411 B2 * | 4/2018 | Kwong .................... G09C 1/00 |
| 10,311,930 B1 * | 6/2019 | Kim ...................... H04L 9/3278 |
| 2014/0293676 A1 | 10/2014 | Lee et al. |
| 2014/0299832 A1 | 10/2014 | Jameson |
| 2018/0033960 A1 | 2/2018 | Jameson et al. |

OTHER PUBLICATIONS

Suh et al., Physical Unclonable Functions for Device Authentication and Secret Key Generation, DAC 2007, Jun. 4-8, 2007, San Diego, California, U.S.A.
Aman et al., Mutual Authentication in IoT Systems using Physical Unclonable Functions, IEEE Internet of Things Journal, May 10, 2017, vol. 4.

* cited by examiner

*Primary Examiner* — Daniel B Potratz

(57) ABSTRACT

An integrated circuit device can include a plurality of nonvolatile memory elements having values that vary randomly or pseudo-randomly from one another; a selection circuit configured to select a plurality of nonvolatile memory elements that vary randomly or pseudo-randomly in response to a received challenge value; and sense circuits configured to generate a response value based on the values of the selected nonvolatile memory elements. Related methods and systems are also disclosed.

7 Claims, 31 Drawing Sheets

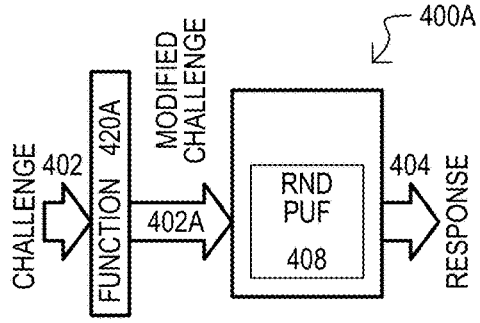

FIG. 4A

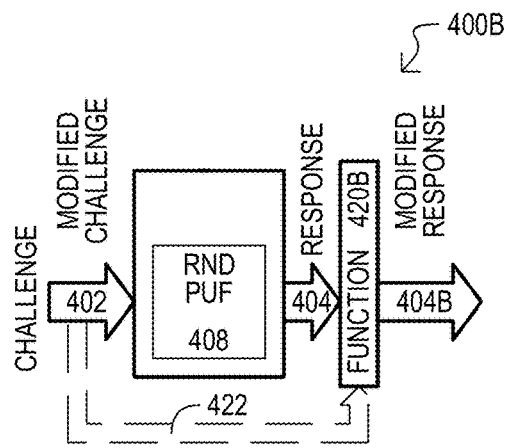

FIG. 4B

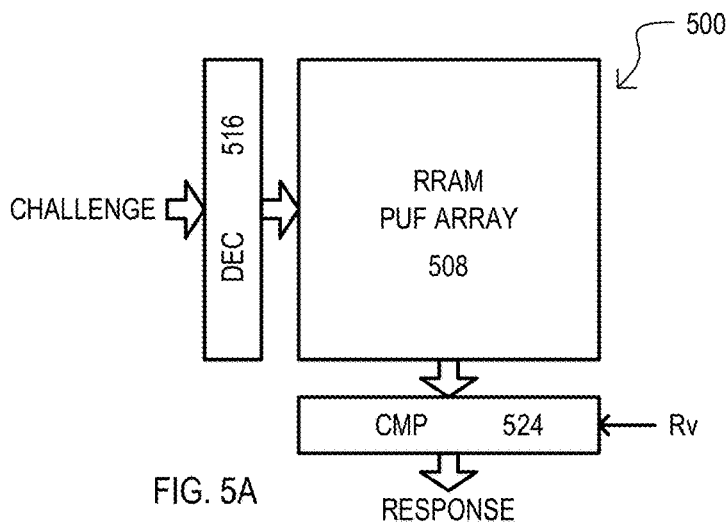

FIG. 5A

| CHALLENGE | RESPONSE | |
|---|---|---|
| Address of cell | 1 if Rc <= Rv<br>0 if Rc > Rv | 526-0 |
| Addresses of cells A & B | 1 if RA <= RB<br>0 if RA > RB | 526-1 |
| Addresses of N cells | 1 if M of the N cells have Rc < Rv<br>0 if M of the N cells do not have Rc < Rv | 526-2 |
| Addresses of N cells | 1 if average R of the N cells is <= Rv<br>0 if average R of the N cells if > Rv | 526-3 |
| Addresses of N cells | 1 if median R of the N cells is <= Rv<br>0 if median R of the N cells if > Rv | 526-4 |

Rv = Verify resistance
RA = Resistance of cell "A"
RB = Resistance of cell "B"
Rc = Resistance of cell

FIG. 5B

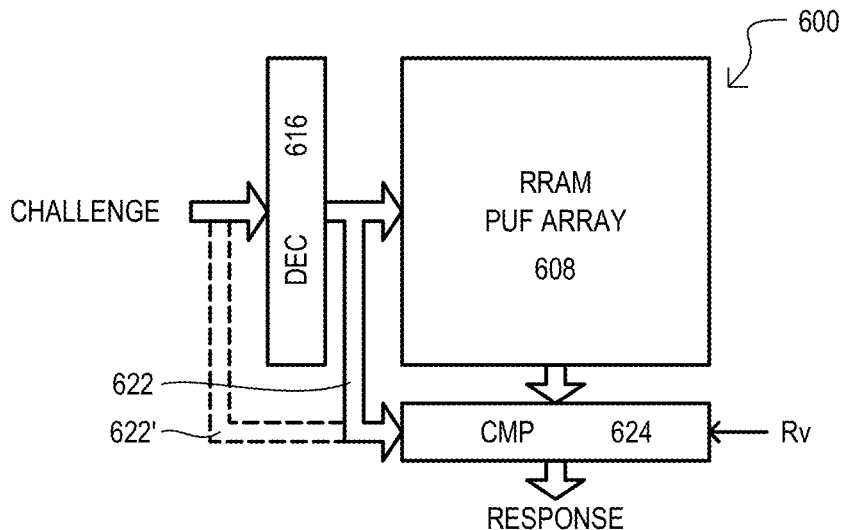

FIG. 6A

| CHALLENGE | RESPONSE | |
|---|---|---|
| Address of cell | 1 if Rc <= Rv & wordline number is odd<br>0 if Rc > Rv & wordline number is odd<br>1 if Rc > Rv & wordline number is even<br>0 if Rc <= Rv & wordline number is even | 626-0 |
| Addresses of cells A & B | 1 if RA <= RB & wordlines for A/B are even/even or odd/odd<br>0 if RA > RB & wordlines for A/B are even/even or odd/odd<br>1 if RA > RB & wordlines for A/B are odd/even or even/odd<br>0 if RA <= RB & wordlines for A/B are odd/even or even/odd | 626-1 |
| Addresses of a cell | 1 if Rc <= Rv & bitline number is odd<br>0 if Rc > Rv & bitline number is odd<br>1 if Rc > Rv & bitline number is even<br>0 if Rc <= Rv & bitline number is even | 626-2 |
| Addresses of cells A & B | 1 if RA <= RB & bitlines for A/B are even/even or odd/odd<br>0 if RA > RB & bitlines for A/B are even/even or odd/odd<br>1 if RA > RB & bitlines for A/B are odd/even or even/odd<br>0 if RA <= RB & bitlines for A/B are odd/even or even/odd | 626-3 |

Rv = Verify resistance
RA = Resistance of cell "A"
RB = Resistance of cell "B"
Rc = Resistance of cell

FIG. 6B

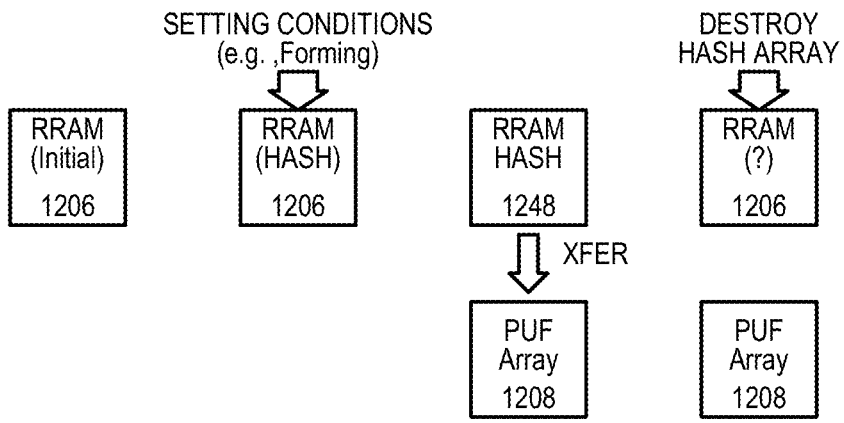
FIG. 12A   FIG. 12B   FIG. 12C   FIG. 12D
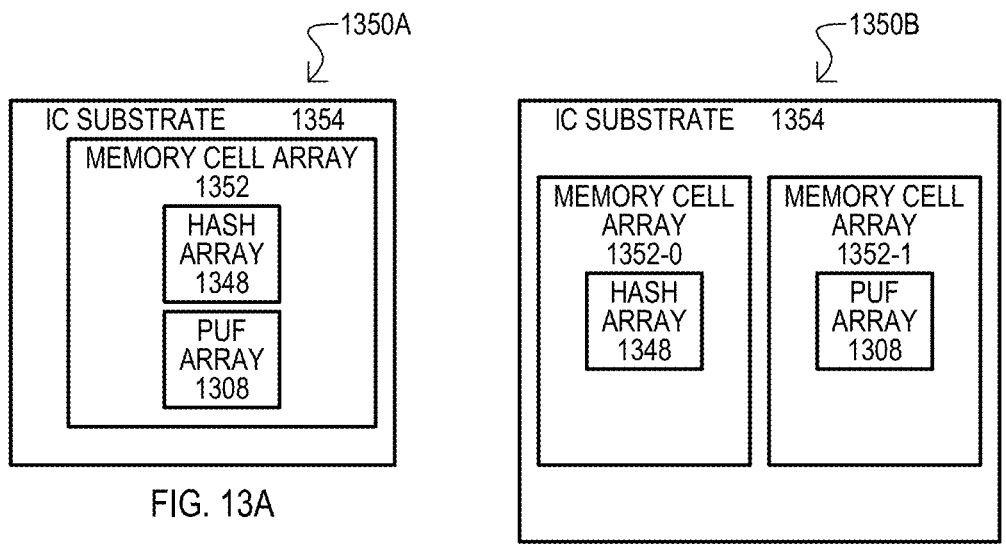
FIG. 13A
FIG. 13B
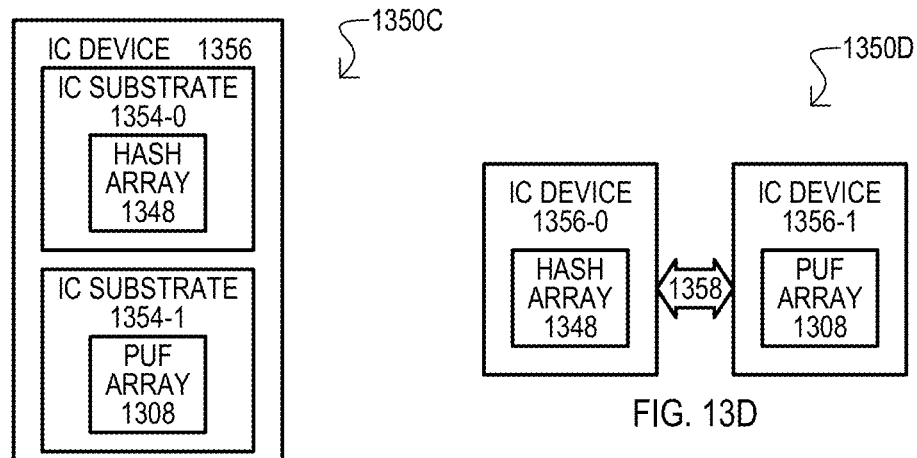
FIG. 13C
FIG. 13D (60/40 DISTRIBUTION)

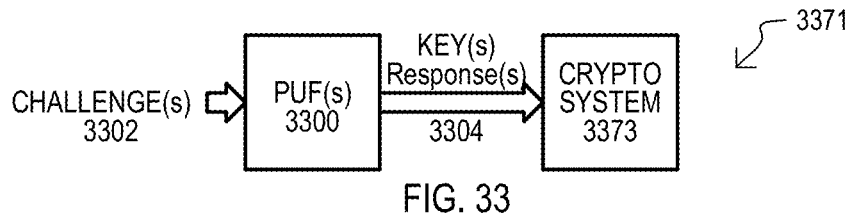
FIG. 33
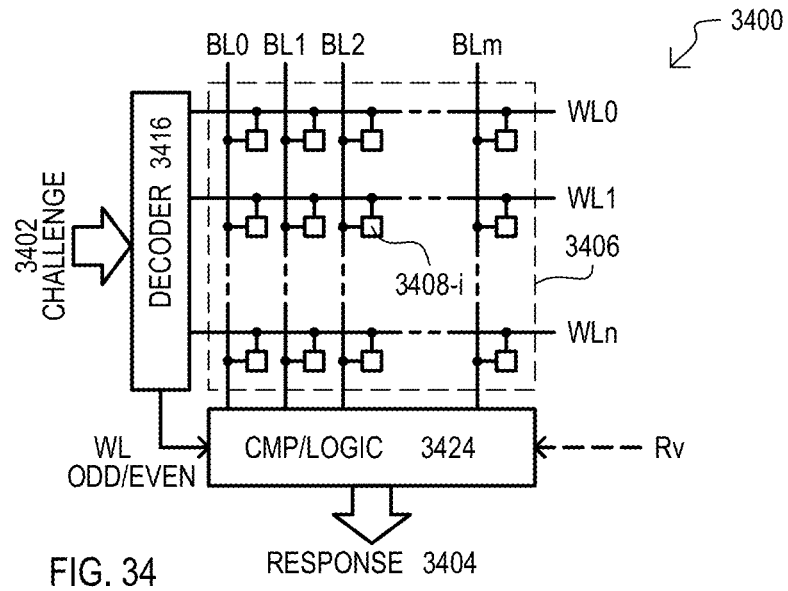
FIG. 34
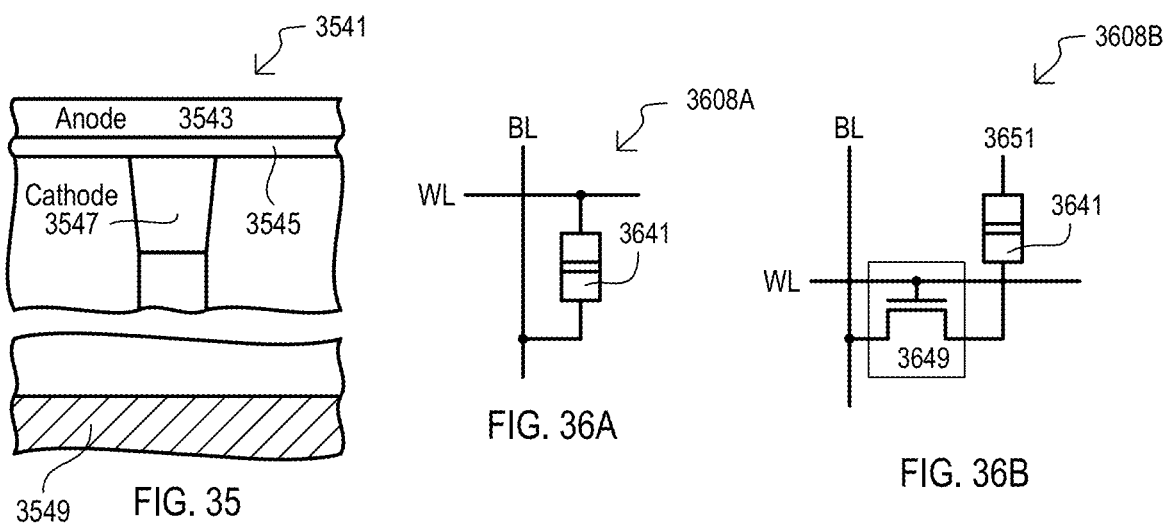
FIG. 35
FIG. 36A
FIG. 36B
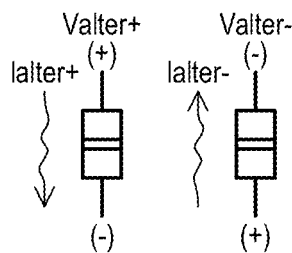
FIG. 37

(BACKGROUND)

PSEUDO PHYSICALLY UNCLONABLE FUNCTIONS (PUFS) USING ONE OR MORE ADDRESSABLE ARRAYS OF ELEMENTS HAVING RANDOM/PSEUDO-RANDOM VALUES

RELATED APPLICATIONS

This application claims the benefit of U.S. Provisional Patent Application Ser. No. 62/732,995, filed Sep. 18, 2018 and Ser. No. 62/805,874, filed Feb. 14, 2019, the contents all of which are incorporated by reference herein.

TECHNICAL FIELD

The present disclosure relates generally to unique identifiers for integrated circuit devices, and more particularly to physically unclonable functions (PUFs) that can be derived with nonvolatile memory elements.

BACKGROUND

A physically unclonable function (PUF) is a physical structure (usually a circuit) within inputs and outputs. An input to a PUF is called a "challenge". An output from a PUF in response to a challenge is called a "response". An internal function of a PUF can map challenges to responses in such a complex manner that it can be impossible or impracticable build a model of the PUF from known challenge/response pairs.

Ideally, a PUF only functions when powered and stores no secret data. Further, different PUFs return different responses to the same challenge and different challenges to the same PUF produce different responses. A given PUF will return the same response to the same challenge. The differences between PUFs are due to physical differences (usually arising during manufacturing) which are hard to measure, hard to predict, and hard to reproduce. One example of a conventional PUF is the exact frequency of a ring oscillator.

Electrical PUFs can be classified based on the type of input they receive and the type of output they provide. Inputs and outputs can include analog values, digital values, or combinations thereof. Accordingly, electrical PUFs can take any of nine different forms.

Currently, the two main uses of PUFs are authentication and the generation of keys in cryptographic operations.

FIG. 38 is a diagram showing an authentication system 3861 that utilizes a PUF. An authentic device 3863 can be manufactured with a PUF 3865-0. Challenge and response values for PUF 3865-0 can be known and/or recorded in an authentication database 3867 retained by a trusted source. An unauthenticated device 3863' can be received via an untrusted supply chain or environment 3869. Unauthenticated device 3863' can include a PUF 3865-1.

An authentication operation can be used to determine if unauthenticated device 3863' is an authentic device (3863). In the authentication operation, an input challenge can be applied to the PUF 3865-1 of unauthenticated device 3863' to generate an output response. The same input challenge can be applied to authentication database 3867 to generate an authentic response. The output response can be compared to the authentic response 3869. If the output response matches the authentic response, the device 3863' can be determined to be the authentic device 3863. As shown by the strikethrough of the first entry in authentication database 3867, once a challenge value has been used for an authentication operation, it is not used again.

While PUFs can play an important role in various applications, a drawback to conventional PUFs can be the complexity and/or cost of the circuits utilized to create a PUF.

An industry sector that can benefit from PUF devices is that of Internet-of-thing (IoT) devices. IoT devices can often use authentication operations to receive critical data, such as updates to firmware and/or encryption/decryption keys. Traditional static random access memory (SRAM) or delay-based PUFs can provide only a limited number of challenge-response pairs (CRPs) and/or suffer from high bit error rates (BERs) for applications requiring a large number of challenge response pairs (CRPs) over time, such as IoT applications. While it is possible to provide a greater number of CRPs by increasing a size of a traditional PUF, the larger size, greater cost, and increased power consumption limits the appeal of such approaches for IoT and similar devices.

It would be desirable to arrive at PUF devices capable of providing a large number of CRPs that can scale without significant increases in size, cost or power.

BRIEF DESCRIPTION OF THE DRAWINGS

FIGS. 4A and 4B are diagrams showing PUF devices in which a challenge and/or response can be altered according to embodiments.

FIGS. 5A and 5B are diagrams showing a PUF array and operations where response values can be determined based on a verify resistance or differential resistance according to embodiments.

FIGS. 6A and 6B are diagrams showing a PUF array and operations where response values can vary according to challenge address values.

FIGS. 12A to 12D are a sequence of diagrams showing how a hash array can be used to form a PUF array according to embodiments.

FIGS. 13A to 13D are diagrams showing various systems that include both a hash array and PUF array according to embodiments.

PUF array values using an initial random value and ECC related functions according to embodiments.

FIG. 33 is a diagram of a cryptographic system according to an embodiment.

FIG. 34 is a diagram of a PUF array according to an embodiment.

FIG. 35 is a side cross sectional view of a resistance element that can be included in embodiments.

FIGS. 36A and 36B are diagrams showing memory cells that can be included in embodiments.

FIG. 37 is a diagram showing resistance setting approaches that can be included in embodiments.

Figure 38:
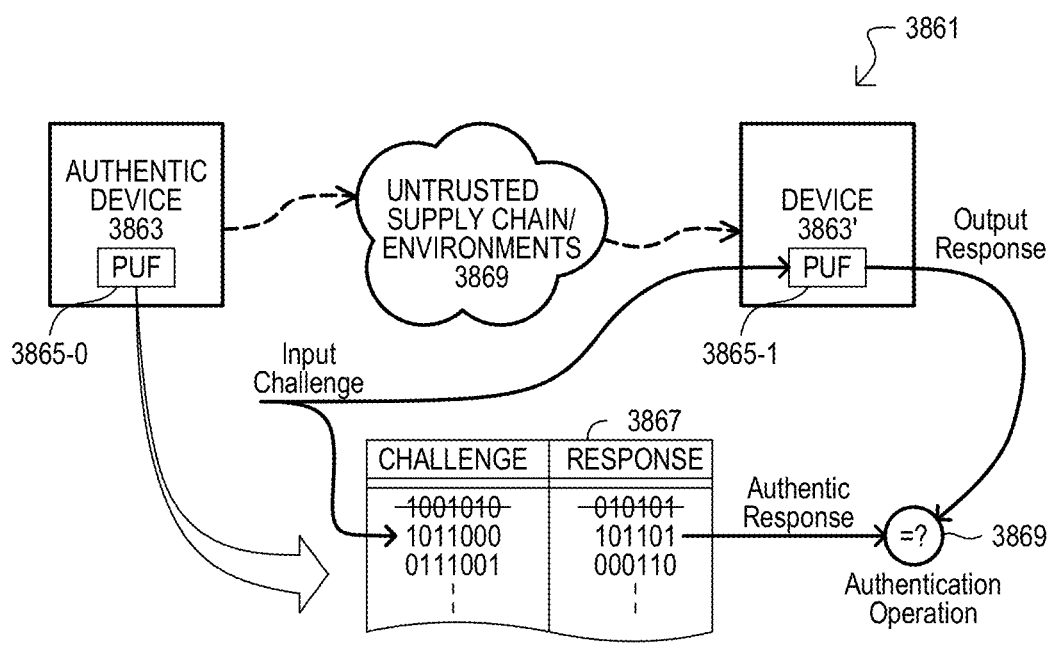

FIG. 38 is a diagram showing a conventional authentication operation.

DETAILED DESCRIPTION

Embodiments described herein can include physically unclonable functions (PUFs), or PUF-like structures that can be formed using one or more PUF arrays of random or essentially random values. In some embodiments, such arrays can utilize variations in the resistance of programmable resistance elements, such as those included in a resistive random access memory (RRAM).

In some embodiments, a PUF device can include a number of small PUF arrays. Challenge values can be varied and applied to the PUF arrays to generate array outputs. Array outputs can be used to access the PUF arrays once more, or to generate a response from the PUF arrays.

In some embodiments, a PUF can be formed of an RRAM array, with challenge values accessing groups of RRAM cells having resistance values that can vary according processing or other variations. Such resistance values can be read/evaluated to generate a response to the challenge. Such device can be considered a "pseudo-PUF" as it could be theoretically possible to determine states of RRAM elements through physical analysis of an unpowered device.

In some embodiments, an RRAM array can be a "hash" array having resistance values that can vary according processing or other variations. Such resistance values can be copied as logic values into another circuit to form a PUF array. Such another circuit may or may not be another RRAM array.

In the various figures shown below, like items are referred to with the same reference numerals but with the leading digit(s) corresponding to the figure number.

Figure 1A:
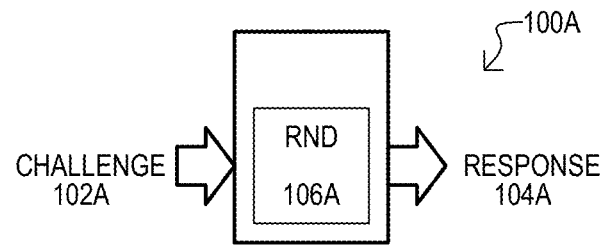
FIGS. 1A to 1C are block diagrams of a physically unclonable function (PUF) devices according to embodiments.

FIG. 1A is a block diagram of a PUF 100A according to an embodiment. A PUF 100A can receive a challenge 102A and output a response 104A corresponding to the challenge 102A. A challenge 102A can be one or more analog values, a digital value, or a combination thereof. Similarly, a response 104A can be analog, digital, or a combination thereof. Within PUF 100A, a challenge 102A, or signals corresponding to the challenge 102A, can be applied to a random array of elements 106A. Based on logic states of elements 106A, response 104A can be generated. In some embodiments, array 106A can take the form of an addressable RRAM array. In some embodiments, resistance states of such RRAM elements can vary according to manufacturing variations resulting in each PUF 100 being essentially unique.

While embodiments can include PUFs created with an RRAM array that utilizes a resistance variation inherent in the RRAM array, other embodiments can copy random or pseudo-random values from an RRAM array into another device, which may or may not be an RRAM array. An example of such an embodiment is shown in FIG. 1B.

Figure 1B:
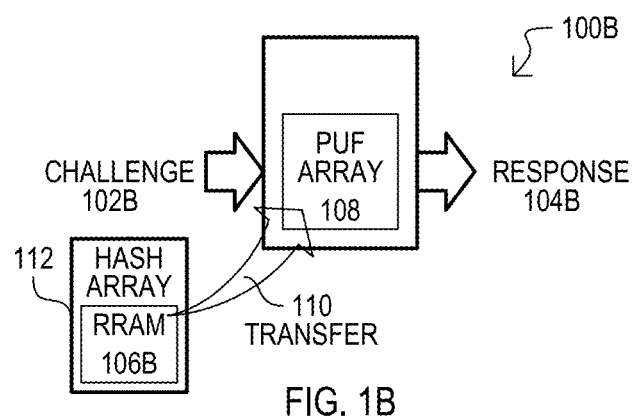

FIG. 1B is a block diagram of a PUF 100B according to another embodiment. A PUF 100B can include PUF array elements 108 that can be accessed with a challenge 102B to generate a response 104B. PUF array elements 108 can have random/pseudorandom values provided by a hash array 112. A hash array 112 can include RRAM elements 106B having a resistance variation as described herein and equivalents. Such a resistance variation (or logic values based on such resistance variation) can be transferred 110 from hash array 106B to PUF array elements 108 to thereby create a PUF array. A transfer operation 110 is not necessarily a copy operation. As but a few examples, a transfer operation 110 can skip hash array values, represent hash array bit values with fewer bits in a PUF array 108, or represent hash array bit values with more bits in a PUF array 108.

PUF array elements 108 can be RRAM elements, and thus subject to the same difficulty in determining logic states by reverse engineering. However, in other embodiments PUF array elements 208 can be any other suitable memory element.

Embodiments can also include PUFs in which a challenge value can be used to access multiple arrays of essentially random values to generate array output values. Such array output values can be evaluated. Based on such an evaluation, the array output values can be used to generate a response value (or serve as the response value), or alternatively, used to access the arrays once again. An example of such an embodiment is shown in FIG. 1C.

Figure 1C:
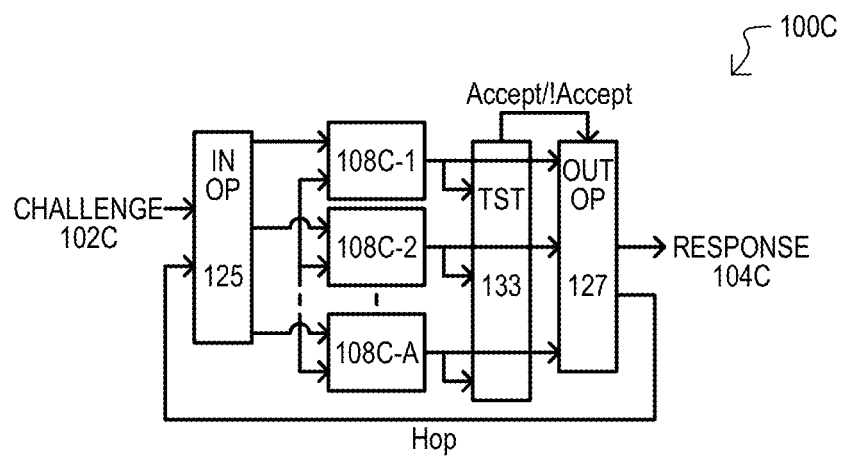

FIG. 1C shows a PUF 100C having an input operation 125, a number of arrays 108C-1 to -A, a test section 133 and an output operation 127. An input operation 125 can manipulate a challenge value before applying it to the arrays (108C-1 to -A). In some embodiments, such a manipulation can include each array (108C-1 to -A) receiving a different value (e.g., permutation of the challenge value). Arrays (108C-1 to -A) can be arrays of different essentially random values, as described for embodiments herein, or equivalents.

Test section 133 can evaluate outputs of arrays (108C-1 to -A). Based on such an evaluation, test section 133 can indicate whether the outputs of the arrays (108C-1 to -A) are accepted or not accepted (Accept/!Accept). Output operation 127 can vary according to results from test section 133. If a test section 133 indicates one result type (e.g., Accept), output operation 127 can use outputs of arrays (108C-1 to -A) to generate a response value 104C. If a test section 133 indicates another result type (e.g., !Accept), output operation 127 can use outputs of arrays (108C-1 to -A) to access arrays (108C-1 to -A) once again (shown as Hop).

In alternate embodiments, arrays 108C-1 to -A may include circuits configured to generate outputs without the use of stored data values, such as circuits configured to produce responses in traditional SRAM and delay-based PUFs and other PUFs familiar to those skilled in the art. Such circuits may include ring oscillators, static RAM (SRAM) elements, delay gates, and comparators as but a few examples. In this manner, embodiments may increase a number of CRPs which can be extracted from circuits used in traditional PUF implementations.

According to embodiments, a system or method can include a number of small arrays (e.g., 512 bits) of random binary data, on which data-dependent operations can be performed. Such operations can increase challenge-response pairs (CRPs) to a number far greater than what would result if a response were generated by simply reading out array data.

Figure 2A:
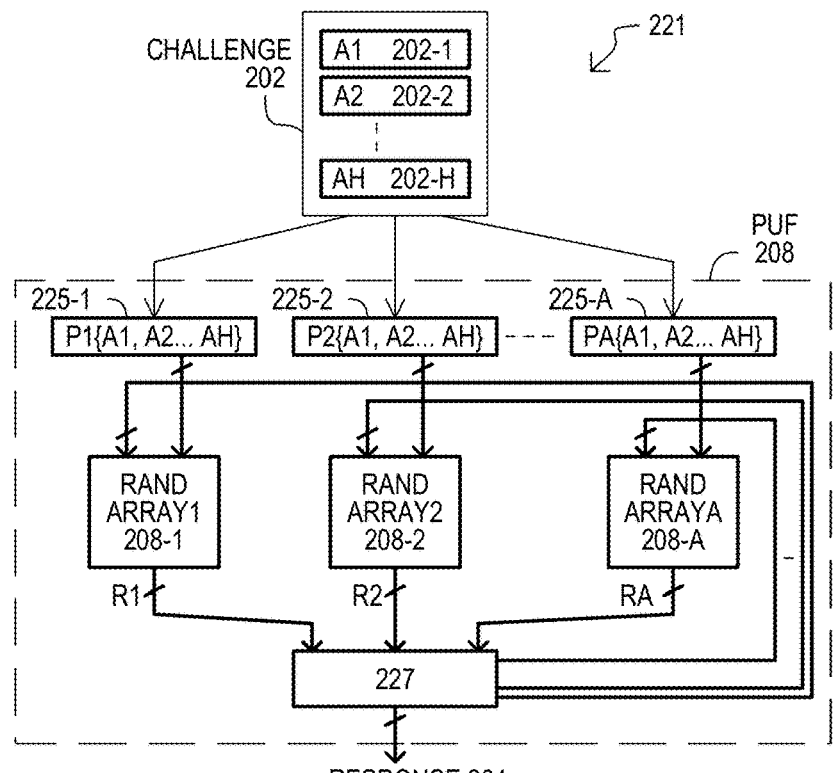
FIG. 2A is a diagram of a "hopping" PUF device and operations according to embodiments.

FIG. 2A is a block diagram showing a system 221 according to an embodiment. A system 221 can input a challenge 202 composed of H "hopper" addresses (202-1 to 202-H). Hopper addresses (202-1 to 202-H) can be relatively small addresses corresponding to small PUF arrays. In some embodiments, hopper addresses can range from 0 to 511. Hopper addresses (202-1 to 202-H) can be arranged in ascending order (e.g., 123, 510 is valid, but not 510, 123). These restrictions can eliminate equivalent challenges, improving the randomness of the responses.

Inside a PUF 208, input operations (225-1 to 225-A) can be applied to the hopper addresses (202-1 to 202-H) to generate "A" different sets of hopper addresses. In some embodiments, input operations (225-1 to 225-A) may comprise permutation operations (P1 to PA) performed on the input hopper addresses (202-1 to 202-H). The different sets of hopper addresses output by input operations (225-1 to 225-A) can be sent to one of A different arrays 208-1 to -A. Each array (208-1 to -A) can perform data-dependent operations on the received addresses to output one or more (shown as R) bits (R1 to RA). Arrays (208-1 to -A) can include essentially random values as described herein. In some embodiments, such arrays can be formed with RRAM cells, but can take any other suitable form.

Array outputs (R1 to RA) (generated in response to different sets of hopper addresses output by input operations (225-1 to 225-A) can be subject to output operations 227 to generate a RESPONSE 204. In some embodiments, array outputs (R1 to RA) can be used to access values in arrays (208-1 to -A) which are then used to generate a response. Such actions can take the form of any of those described herein, or equivalents, such as those shown in FIGS. 19A to 20, and 23A to 25D, as but a few examples.

Having described an overall system/method 221, examples of array operations will now be described.

Figure 2B:
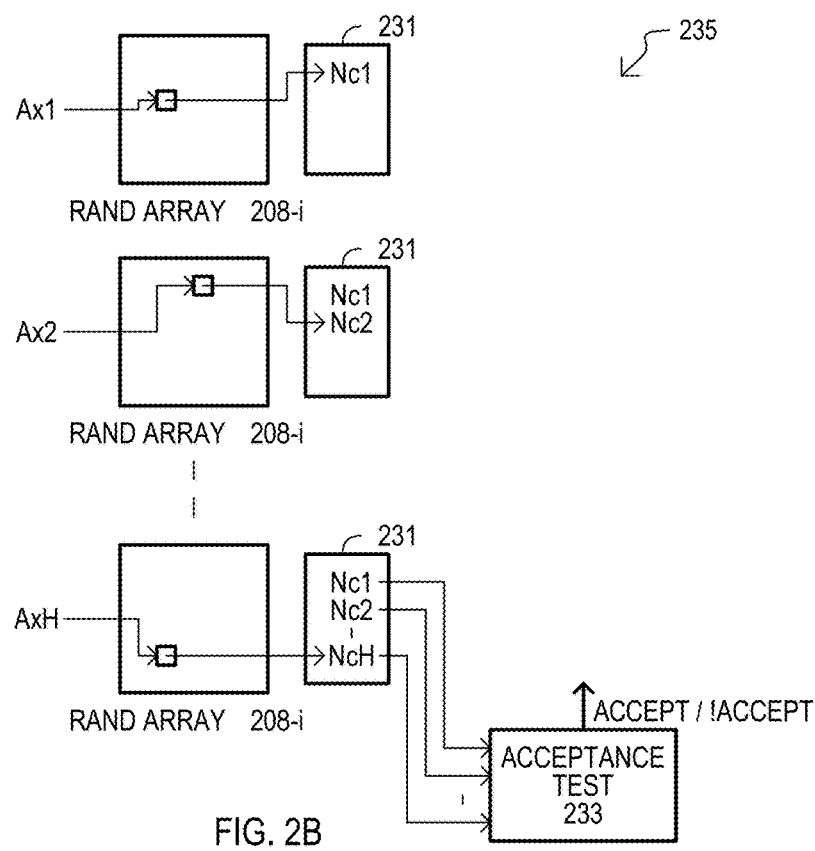
FIGS. 2B to 2D are diagrams of array operations that can be included in hopping PUF operations like those of FIG. 33, according to embodiments.
Figure 2C:
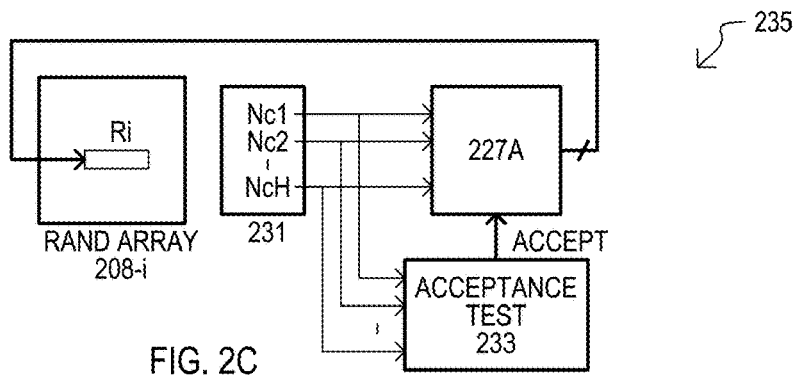
Figure 2D:
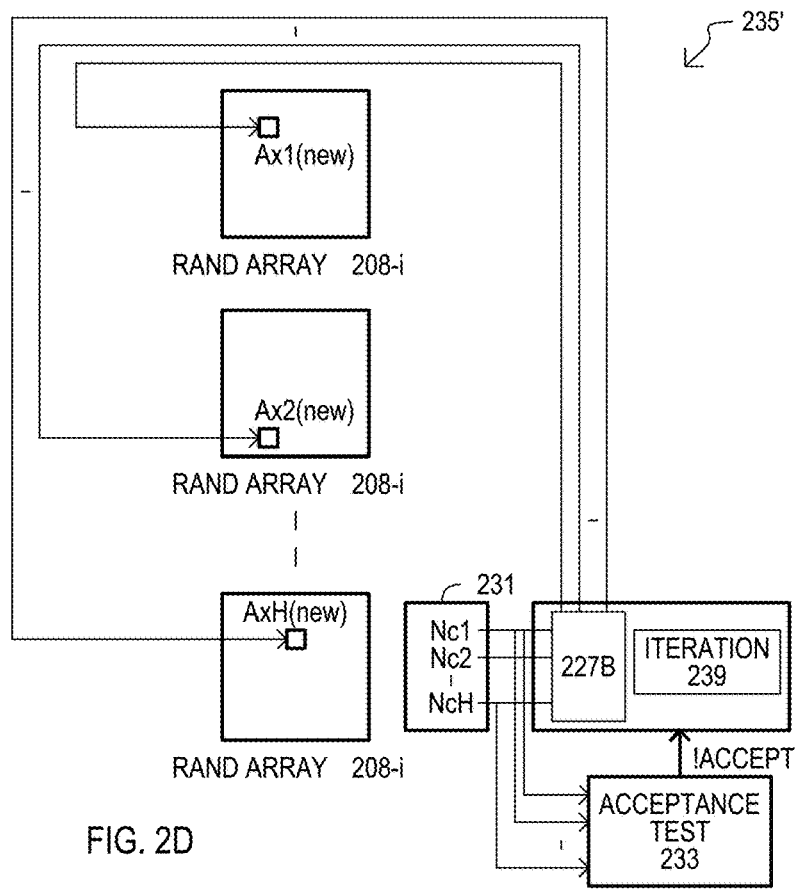

FIGS. 2B to 2D are diagrams showing a method 235 used to produce array outputs according to an embodiment. A method 235 can generate an array output like those shown as R1 to RA in FIG. 2A.

Referring to FIG. 2B, in a given array, Nc "compare" bits can be read for each of the H hopper addresses. In the example of FIG. 2B, this is shown by hopper address Ax1 being applied to array 208-i to generate compare bits Nc1, and hopper address Ax2 being applied to array 208-i to generate compare bits Nc2. Such operations can continue until hopper address AxH is applied to array 208-i to generate compare bits NcH. In some embodiments, values Nc1 to NcH can be stored in storage circuits 231.

Once a set of compare bits (e.g., Nc1 to NcH) have been read out from an array 208-i, an acceptance test 233 can be performed on the H sets of compare bits to decide if an array output (e.g., R1 to RA) should be generated. An acceptance test 233 can be any suitable logic function. In some embodiments, an acceptance test 233 can determine whether all or a portion of compare bits (e.g., Nc1 to NcH) are the same for all H hopper addresses (Ax1 to AxH).

According to embodiments, if compare bits (Nc1 to NcH) pass an acceptance test 233, the compare bits can be used to generate array output (e.g., R1 to RA). However, if compare bits (Nc1 to NcH) do not pass an acceptance test 233, the compare bits can be used to generate new hopper addresses to their respective array.

FIG. 2C shows an example of array operations 235 in the event compare bits (Nc1 to NcH) pass an acceptance test. In response to passing an acceptance test (ACCEPT), all or a portion of compare bits (e.g., Nc1 to NcH) can be subject to an output operation 227A. An output operation 227A can use compare bits (e.g., Nc1 to NcH) to generate an address that is applied to array 208-i to generate an array output (Ri). Such an output operation 227A can take the form of any of those described herein, or equivalents. Alternatively, in some embodiments, all or a portion of the compare bits (e.g., Nc1 to NcH) can form the array output Ri.

FIG. 2D shows an example of array operations 235' in the event compare bits (Nc1 to NcH) do not pass an acceptance test. In response to not passing an acceptance test (!ACCEPT) all or a portion of compare bits (e.g., Nc1 to NcH) can be subject to an output operation 227B used to generate new hopper addresses (Ax1(new) to AxH(new)). The process can repeat (e.g., FIG. 2B) by reading out new compare bits from the new hopper addresses (Ax1(new) to AxH (new)). The acceptance test 233 can then be repeated. This "hopping" can end when an acceptance test is passed, or a maximum allowed number of hops is exceeded. An iteration counter 239 can determine when a maximum number of hops is exceeded. In some embodiments, all or a portion of the compare bits (e.g., Nc1 to NcH) can form new hopper addresses (Ax1(new) to AxH(new)).

Referring still to FIGS. 2B to 2D, under the requirements that H hopper addresses of a challenge are unique and arranged in ascending order, the number of valid challenges, and hence number of CRPs (NCRP), can be given by:

$$NCRP=(2^{Nadd})!/(NH!(2^{Nadd}-NH)!)$$

where $2^{Nadd}$ is the number of logical bits in each of the A arrays and NH is the number of hopper addresses.

From the above, the dependence on array size of NCRP is a power-law with an exponent of NH. A minimum number of hoppers is NH=2, meaning NCRP scales quadratically or better with array size, providing an efficient path to increasing the CRP space. This is in contrast to conventional PUF approaches.

Figure 2E:
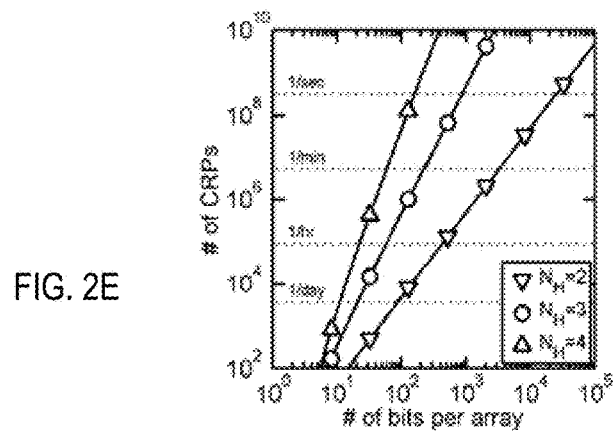
FIG. 2E is a graph showing how a hopping PUF architectures according to embodiments can provide a large number of challenge response pairs (CRPs) at lower power consumption and/or cost than conventional PUFs.

FIG. 2E is a graph showing a number of CRPs based on Nadd and NH systems and methods like those shown in FIGS. 2A to 2D. As shown, with just 512 bits per array (Nadd=9) and three hoppers (NH=3), enough CRPs (NCRP=2.2×10$^7$) can be generated to allow the PUF to provide a unique CRP every 15 seconds for 10 years, enough to support frequent security operations.

In this way, a PUF device having multiple, relatively small arrays can generate an extremely large number of CRPs. In some embodiments a small array can be an array with about 8,192 or fewer addressable locations. In other embodiments, a small array can be an array with about 2,048 or fewer addressable locations. In still other embodiments, a small array can be an array with about 512 or fewer addressable locations.

Figure 3A:
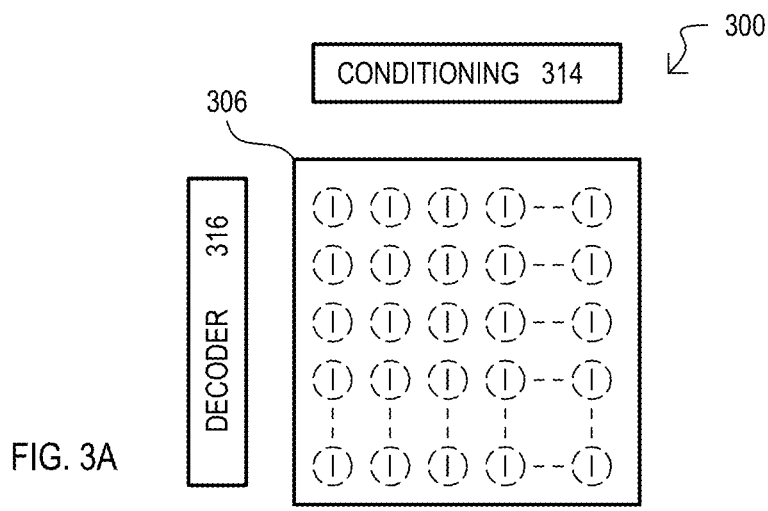
FIGS. 3A to 3C are a sequence of diagrams showing a PUF device and operations according to embodiments.
Figure 3B:
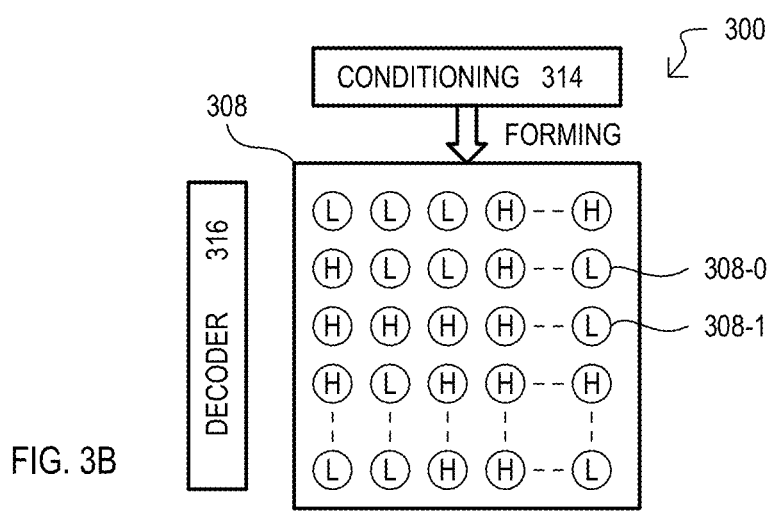
Figure 3C:
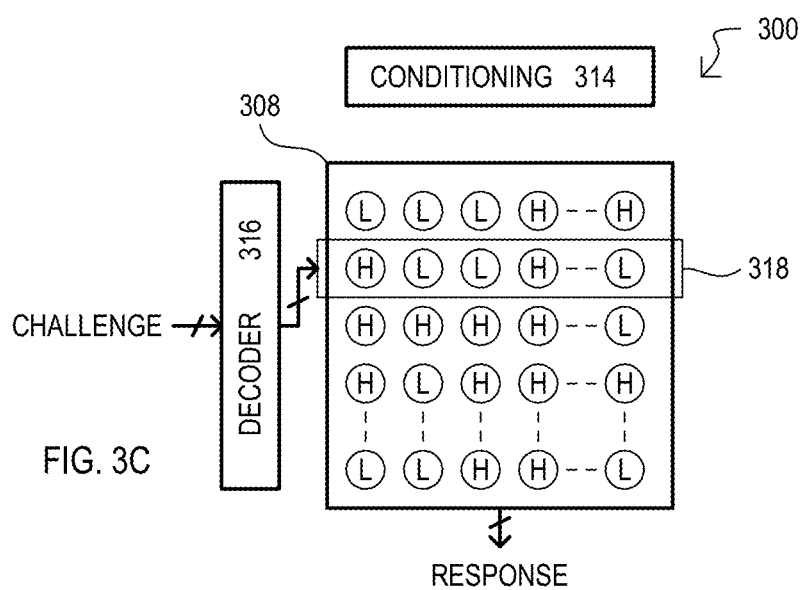

FIGS. 3A to 3C are a sequence of diagrams showing a device 300 according to an embodiment. A device 300 can be PUF array or a hash array. Device 300 can include a RRAM array 306, conditioning circuits 314, and access circuits 316. A RRAM array 306 can include an array of RRAM elements (two shown as 308). Conditioning circuits 314 can apply predetermined electrical conditions to the RRAM elements. Such conditions can include a voltage and/or current. Further, a voltage/current can be static or dynamic in magnitude and constant or intermittent in application. Access circuits 316 can access RRAM array 306 in response to an input value (e.g., CHALLENGE). In some embodiments, access circuits can include decoder circuits that access one or more RRAM cells in response to an input value.

FIG. 3A shows a device 300 in an initial state. RRAM cells of RRAM array 306 (two shown as 308-0) can have an initial manufactured state (shown as I). In some embodiments, RRAM cells can include a material programmable between different resistance states by application of electrical fields, and such an initial state can be prior to the application of any electrical signals to the RRAM cells (i.e., a "virgin" state).

FIG. 3B shows a device 300 undergoing a "forming operation". In a forming operation, electrical signals can be applied to the RRAM cells by conditioning circuits 314. Such a forming operation can result in some or all RRAM cells having relatively fixed resistance, but at an essentially random distribution. Accordingly, with respect to a reference resistance, some RRAM cells can have a resistance greater than a reference (shown as H, e.g., 308-1) and a resistance less than the reference (shown as L, e.g., 308-0). In other embodiments, such initial states can be reinforced or otherwise set by other steps (e.g., increase high resistance RRAM cells, decrease low resistance RRAM cells).

Referring still to FIG. 3B, a forming operation can result in essentially random values based on variations in RRAM cell materials. This is in contrast to conventional approaches in which an algorithm generates a random bit pattern, and such a pattern is written into the RRAM array. Further, application of forming electrical conditions can be significantly faster. Rather than access each RRAM cell in a write operation, groups of RRAM cells, or the entire RRAM array can be "formed" at the same time. According to embodiments, RRAM cells can have a resistance distribution where X % of the RRAM cells are above a verify resistance and 100-X % are below the verify resistance. A percentage X % can be around 50%.

After a "forming operation" and optionally other reinforcing operations, a RRAM array 306 can function as a PUF array 308.

FIG. 3C shows a device 300 in a challenge—response operation. A CHALLENGE value is applied to PUF array 308, which accesses a group of cells 318. A group of cells 318 can have essentially random values, and thus serve as a PUF RESPONSE to the input CHALLENGE.

While embodiments can include applying challenges to directly select response values from a random/pseudo-random RRAM array, embodiments can also modify challenges and/or response values. Such arrangements can further obscure PUF operations, making it even more difficult to discern a PUF structure. Examples of two such embodiments are shown in FIGS. 4A and 4B.

FIG. 4A is a block diagram of a device 400A according to an embodiment. A device 400A can include a PUF array 408 and a function block 420A. A PUF array 408 can include memory cells having essentially random values, and in some embodiments can include an RRAM array having inherent essentially random resistance variation, or an array created by a hash array having such an inherent essentially random resistance variation. A device 400A can operate in a manner like that of FIGS. 1-3B. However, prior to being applied to a PUF array 408, all or a portion of a digital value CHALLENGE can be subject to one or more operations by function block 420A. Such operation(s) can include any suitable arithmetic/logic operation. A function block 420A can generate a MODIFIED CHALLENGE 402A which can then be applied to a PUF array 408 to generate a RESPONSE 404.

FIG. 4B is a block diagram of a device 400B according to a further embodiment. A device 400B can include a PUF array 408 and a response function block 420B. A device 400B can operate in a manner like that of FIGS. 1-3B. However, rather than output a CHALLENGE value composed of bits derived from directly reading PUF array 408, all or a portion of the CHALLENGE value can be subject to one or more operations by function block 420B to generate a MODIFIED RESPONSE 404B. Such operation(s) can include any suitable arithmetic/logic operation and can operate on all or a portion of the RESPONSE value 404. Further, in some embodiments, a function block 420B operation can include all or a portion of a CHALLENGE 402 (e.g., via data path 422).

The inclusion of function blocks 420A and/or 420B can serve to obscure internal operations of a PUF device, making the PUF device more difficult to model and/or clone.

FIGS. 5A and 5B are diagrams showing a PUF device and operations according to additional embodiments. FIG. 5A is a block diagram of PUF device 500 that includes a RRAM based PUF array 508, a decoder 516, and a compare circuit 524. A RRAM PUF array 508 can include RRAM elements having random/pseudo-random (i.e., essentially) resistance values as described herein and equivalents. A decoder 516 can apply one or more addresses (i.e., CHALLENGES) to RRAM PUF array 508 to select a corresponding RRAM cell or group of RRAM cells. A compare circuit 524 can compare resistance values of selected RRAM cells (i.e., RRAM cells selected by a CHALLENGE) to other resistance values, as will be described herein, to thereby determine a RESPONSE value. In some embodiments, a compare circuit 524 can compare RRAM cell resistance values to a verify resistance Rv. A verify resistance Rv can be a single resistance, and a RESPONSE can be composed of binary values. However, in other embodiments a verify resistance Rv can include more than one resistance, and each RESPONSE values corresponding to an RRAM cell can include more than two possible states.

Referring to FIG. 5B, various possible operations 526 of a PUF device like that shown in FIG. 5A are shown in a table. In the table, RA can be the resistance of a RRAM cell at an address "A", RB can be the resistance of a RRAM cell at an address "B", Rc is the resistance of a cell (accessed by a CHALLENGE), and Rv is a verify resistance.

In a first operation 526-0, a RESPONSE bit value can vary according to whether it is greater than or less-than-or-equal to Rv. Accordingly, compare circuit 524 can read or receive resistance values accessed by a CHALLENGE value, compare them to Rv, and generate "0" or "1" accordingly.

In a second operation 526-1, RESPONSE bit values can be compared to one another. Two addresses (A and B) can be applied to RRAM PUF array 506. Such addresses can be parts of a same CHALLENGE. In response to the two addresses, two different resistances (RA and RB) can be accessed. Compare circuit 524 can compare the resistances (RA/RB) to one another and generate "0" or "1" accordingly.

In a third operation 526-2, multiple cell values can be compared to Rv. If a certain number the cells have a resistance greater than Rv, a RESPONSE bit can have one value. However, if the certain number of cells does not have a resistance greater than Rv, a RESPONSE bit can have another value. In particular, "N" addresses (where N is odd and >1) can be applied to a RRAM PUF array 506. Such addresses can be parts of a same CHALLENGE. Compare circuit 524 can compare the resistance of each of N cells to Rv. Based on whether M cells (M<N) have a resistance greater than Rv, a RESPONSE bit of "0" or "1" can be generated.

In a fourth operation 526-3, an average of multiple cell values can be compared to Rv. "N" addresses (where N is >1) can be applied to a RRAM PUF array 508. Such addresses can be parts of a same CHALLENGE. Compare circuit 524 can average a resistance of the N cells can compare the average to Rv. Based on such a comparison, a RESPONSE bit of "0" or "1" can be generated.

In a fifth operation 526-3, a median of multiple cell values can be compared to Rv. Thus, the operation can be like that of 526-3, but compare a median resistance to Rv.

FIGS. 6A and 6B are diagrams showing a PUF device and operations according to further embodiments. FIG. 6A is a block diagram of PUF device 600 that includes a RRAM PUF array 608, a decoder 616, a compare circuit 624, and an address data path (622 or 622'). A RRAM PUF array 608 can include RRAM elements having random/pseudo-random resistance values as described herein and equivalents. A decoder 616 can decode address values (i.e., CHALLENGE) to RRAM PUF array 608 to select a corresponding RRAM cell or group of RRAM cells. A compare circuit 624 can compare resistance values of selected RRAM cells to other resistance values, and further based on address values, determine a RESPONSE value.

Address data path 622 can provide decoded address values to compare circuit 624. Alternate address data path 622' an apply address values directly to compare circuit 624.

Referring to FIG. 6B, various possible operations 626 of a PUF device like that shown in FIG. 6A are shown in a table. RA, RB, Rc and Rv can be values as described with reference to FIG. 5B.

In a first operation 626-0, compare circuit 624 can compare a resistance of an addressed RRAM cell to a verify resistance Rv. Such a determination can be logically combined with the address information of the cell to arrive at a RESPONSE bit value. In the embodiment shown, the address information can represent whether a wordline that accesses the RRAM cell is even or odd.

In a second operation 626-1, resistance values of two RRAM cells can be compared to one another. The result of such a comparison can be logically combined with the address information of the RRAM cells to arrive at a RESPONSE bit value.

A third operation 626-2 can occur like a first operation 626-0 but using a bit line number as the address information.

A fourth operation 626-3 can occur like a second operation 626-1 but using a bit line pair number as the address information.

According to embodiments, a resistance of a cell in a RRAM PUF may be altered by electrical operations such as the application of a voltage or current. Electrical operations can include forming, program, and erase operations used in memory applications for RRAM cells. Embodiments can rely on the property that multiple RRAM cells subjected to the same electrical operation(s) will usually not all have the same resistance but will instead exhibit a distribution of resistances.

Digital responses may be obtained by specifying addresses of cells which are all in a same resistance distribution, such as a distribution resulting from a forming operation, a program operation, an erase operation, or no operation at all (i.e., as-fabricated cells). Digital responses may also be obtained by specifying addresses of cells which are in different distributions.

Figure 7A:
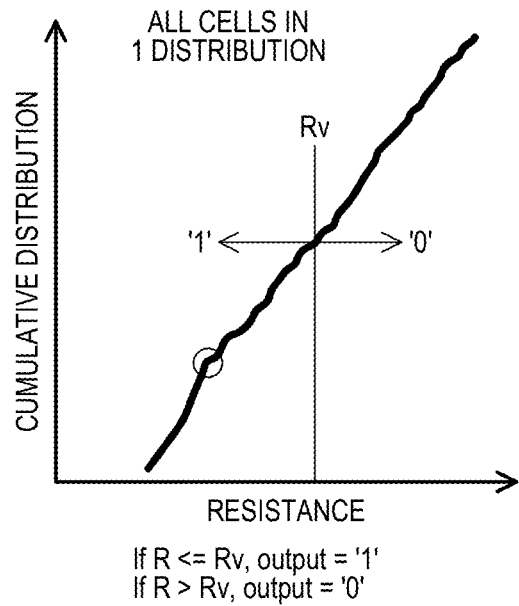
FIGS. 7A and 7B are diagrams showing resistance distributions of a PUF or hash array according to embodiments.
Figure 7B:
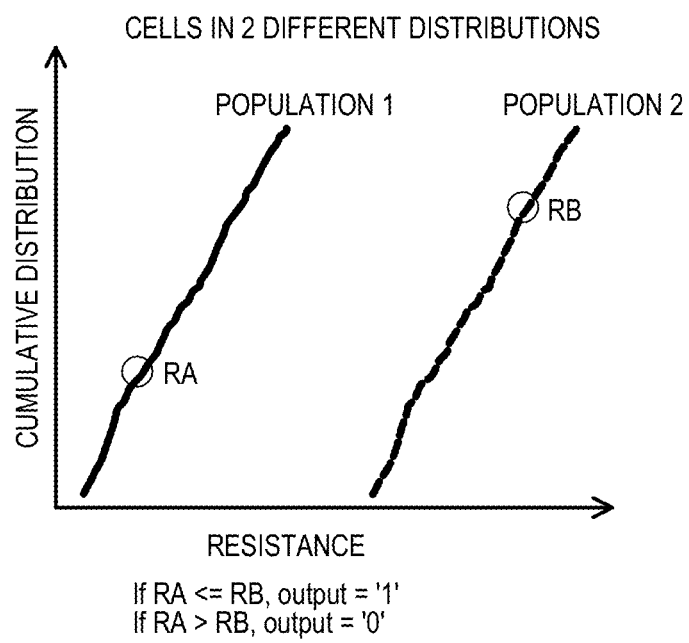

FIGS. 7A and 7B show examples of RRAM cell resistance distributions for a case where cells have one distribution and two distributions. FIG. 7A is a graph showing resistance versus a cumulative distribution for a set of RRAM cells. Individual elements of a digital response can be derived from cells within this same resistance distribution. That is, the resistances of all the cells can be obtained via a same electrical operation or algorithm (an algorithm may subject a given cell to more than one operation, e.g., an erase operation followed by a program operation). In FIG. 7A, the elements of a response can be determined by whether or not individual cells are above or below a verify resistance Rv after an operation (e.g., program) has been applied to all of them. FIG. 7A can be one representation of an operation like that shown as 526-0 in FIG. 5B.

FIG. 7B is a graph showing resistance versus a cumulative distribution for a set of RRAM cells. Individual elements of a digital response can be derived from cells from different R distributions. That is, the resistances of RRAM cells can be obtained via different electrical operations or algorithms. In FIG. 7B, elements of a response can be determined by comparing a RRAM cell resistance (e.g., RA) from one distribution (Population 1) to that of a RRAM cell resistance (e.g., RB) from another distribution (Population 2). In some embodiments, one distribution (e.g., Population 1) can be created by RRAM cells which have been programmed (or formed), while another distribution (Population 2) can be one that has been erased or not formed (i.e., as-fabricated). FIG. 7B can be one representation of an operation like that shown as 526-1 in FIG. 5B.

While FIGS. 7A to 7B show embodiments having one and two distributions, as noted herein, alternate embodiments can include embodiments having greater numbers of distributions.

While embodiments can include RRAM PUFs, embodiments can also include methods of preparing RRAM cells to function in PUF applications. According to embodiments, a method of preparing RRAM cells can include Determining an initial write type by choosing a target resistance state (e.g., a low resistance state, LRS and/or a high resistance state HRS). Once a target resistance state has been determined, a technique for achieving the resistance state can be selected (e.g., forming, programming, or erasing). As but a few examples, embodiments can include applying forming pulses to virgin bits, erase pulses to programmed bits, or program pulses to erased bits.

After applying the initial electrical conditions (e.g., write pulse), a status of each bit can be confirmed, and a number of each state can be counted.

If the total bit count has not reached the predefined target level for the state, the electrical conditions can be reapplied until the desired target level is achieved.

A status of each bit (e.g., LRS or HRS) can be determined by comparing its resistance to one or more reference resistances.

Once the predefined target for the states has been reached, electrical conditions can be applied (or reapplied) to reinforce the target state (e.g., LRS or HRS), that a particular bit is currently in. Such reinforcing conditions can be used to increase the window between two different states (e.g., LRS and HRS).

In order to widen the state (e.g., LRS-HRS) window, the reinforcing electrical (e.g., write pulse) conditions can be stronger than the initial write pulse conditions (e.g., greater current, voltage and/or time).

Additional state window widening may be possible by applying appropriate electrical conditions to the bits that are in the opposite state of the target resistance state.

Additional state window widening may also be possible by reapplying electrical conditions to the bits that failed during various stress tests (e.g., data retention test, bake test and/or burn-in test).

Figure 8:
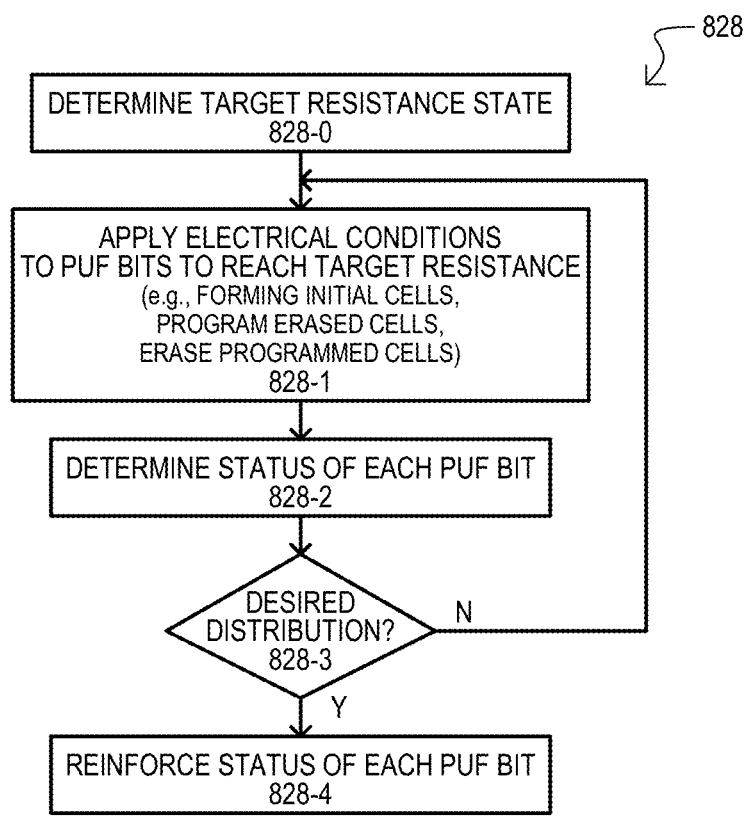
FIG. 8 is a flow diagram of a method of forming a PUF array according to an embodiment.

FIG. 8 is a flow diagram of a method 828 of setting hash or PUF array resistance states according to an embodiment. A method 828 can include determining a target resistance state 828-0. Such an action can include deciding how many RRAM cells are to have a particular resistance state, and how many are not to have the particular resistance state.

Electrical conditions can be applied to PUF bits to reach the target resistance 828-1. Such actions can include any suitable conditions for a given technology and can include but are not limited to: forming initial (i.e., virgin) RRAM cells, programming previously erased RRAM cells, or erasing previously programmed RRAM cells. A method 828 can determine a status of each PUF bit 828-2. Such an action can include sensing a resistance of each RRAM cells according to any of the techniques described herein or equivalents.

If a desired distribution is not reached (N from 828-3), a method 828 can reapply electrical conditions (return to 828-1). As understood from the descriptions herein, reapplied electrical conditions may or may not be the same as previous electrical conditions. Further, reapplied electrical conditions can be applied to a subset of RRAM cells compared to previous electrical conditions. If a desired distribution is reached (Y from 828-3), a method 828 can reinforce a status of each PUF bit 828-4. Such an action can include increasing a separation of different state distributions. As but one example, PUF bits having low resistance state can be subject to electrical conditions that will lower their resistance further, and PUF bits having a high resistance state can have their resistance increased further.

Additional methods for preparing RRAM cells for PUF bit arrays will now be described. In the following descriptions RRAM cells can have a higher resistance state, referred to as an erased state or ROFF state, and a lower resistance (RON) state.

According to embodiments, a number of stages can be used to arrive at different RON distributions. One such embodiment will be described with reference to FIGS. 9A and 9B.

Figure 9A:
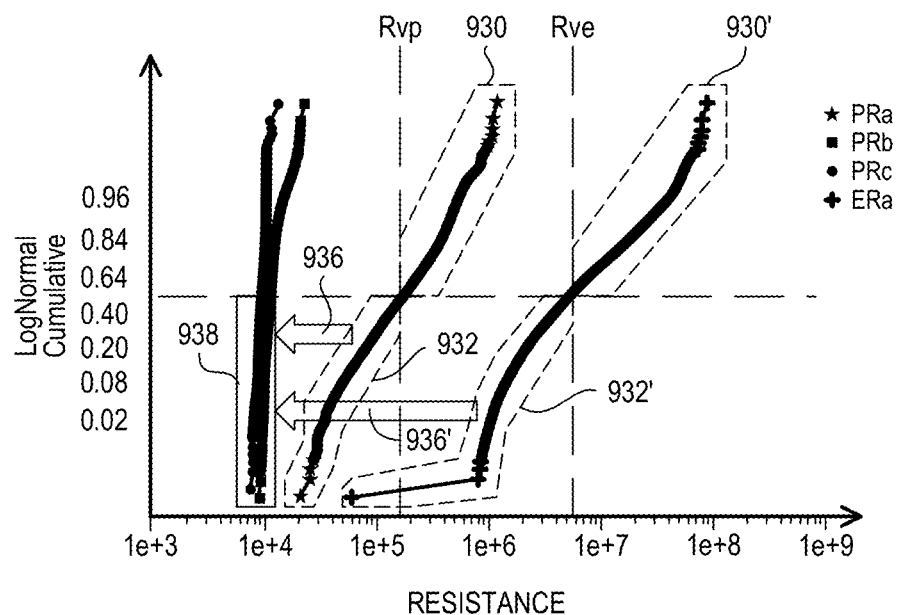
FIGS. 9A and 9B are diagrams showing methods of using multiple resistance distributions of an RRAM array to form a PUF or hash array according to embodiments.

FIG. 9A is a graph showing a distribution of RRAM cells (log normal, cumulative) based on resistance. FIG. 9A shows the RRAM cells after being erased to the ROFF state (ERa). From the ROFF state, the RRAM cells can be placed in a number of different RON states through a series of stages:

Stage #1 (PRa): Electrical conditions can be applied (PRa) which can move RRAM cells from the ROFF state to a lower resistance level. In some embodiments (e.g., CBRAM type cells), this can include using a low programming current (IPR). A resulting RON resistance range can be established by the IPR and a program (PR) Verify resistance. PRa of FIG. 9A shows one example of RRAM cells following such a stage.

Stage #2 (PRb): Further electrical conditions can be applied that move the RRAM cells to a lower resistance level. In some embodiments (e.g., CBRAM type cells) this can include using a higher IPR and very short pulse width. PRb of FIG. 9B shows one example of RRAM cells following such a stage.

Stage #3 (PRc): In some embodiments, this can be a repeat of Stage #2, but applied to "tail" bits (RRAM cells at the edges the distribution) to further straighten a resulting RON distribution. PRc of FIG. 9A shows one example of RRAM cells following such a stage.

Figure 9B:
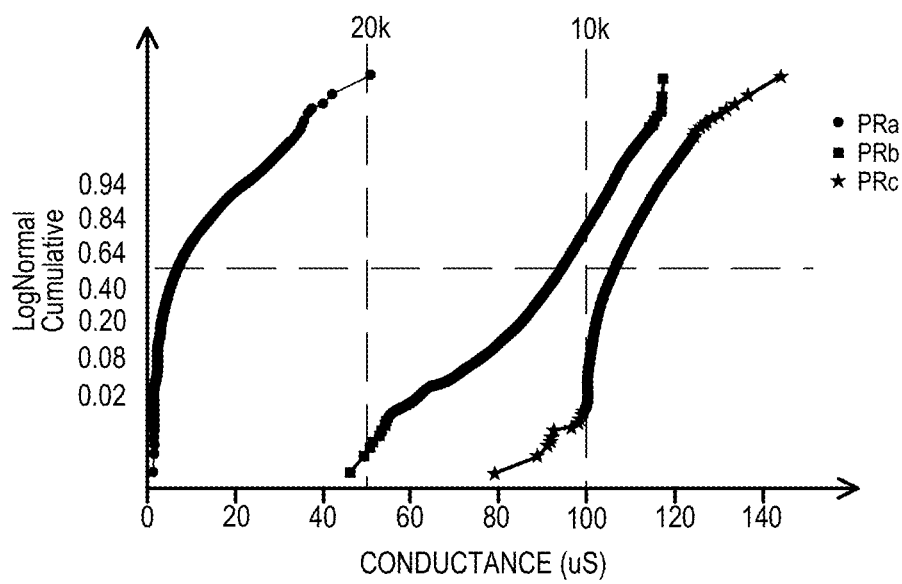

FIG. 9B is a graph showing example of PRa, PRb and PRc distributions but in terms of conductance, and without the ERa distribution.

Referring back to FIG. 9A, PUF applications for the RRAM distributions will now be described. In general, a wide resistance distribution can be divided into different states based on one or more reference (e.g., verify) resistances. One or more of the states can then be reinforced.

In a first example, PRa conditions can be used on all bits to randomly place them at a very wide distribution (shown as 930/932). Then, PRc conditions (operation 936) can be applied to bits smaller than a particular resistance level (Rvp), to place them in a lower resistance state 938. Such a lower resistance 938 can have a better retention ability than their previous state 932.

In a second example, all bits can be randomly placed in a wide distribution by using the ROFF state (Era) (show as

930'/932'). Then, PRC conditions (operation 936') can be applied to bits smaller than a particular resistance level (Rve), to place them in a lower resistance state 938.

Figure 10A:
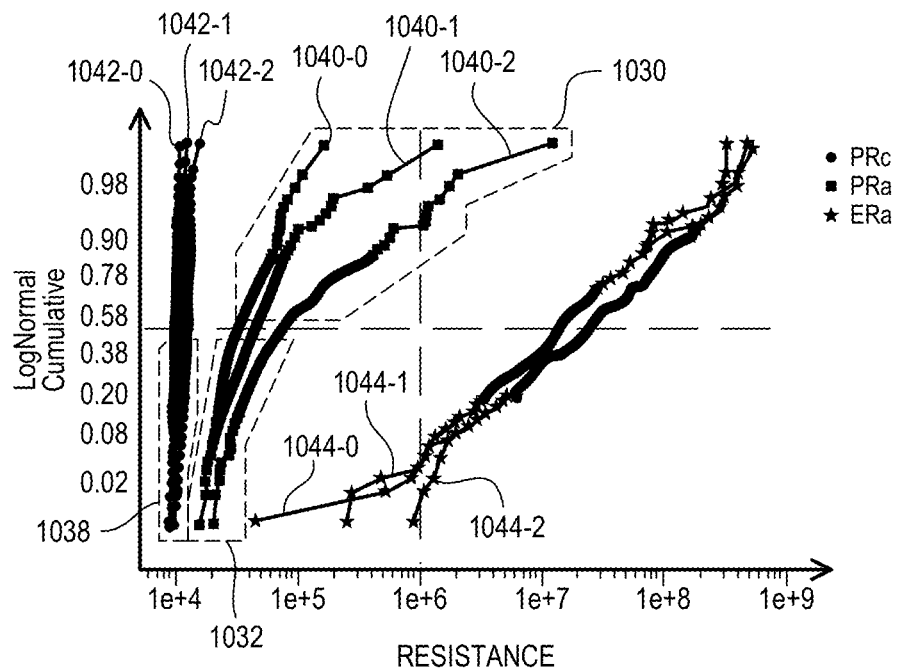
FIGS. 10A and 10B are diagrams showing how PUF or hash array operations according to embodiments are resistant to drift in resistance values.
Figure 10B:
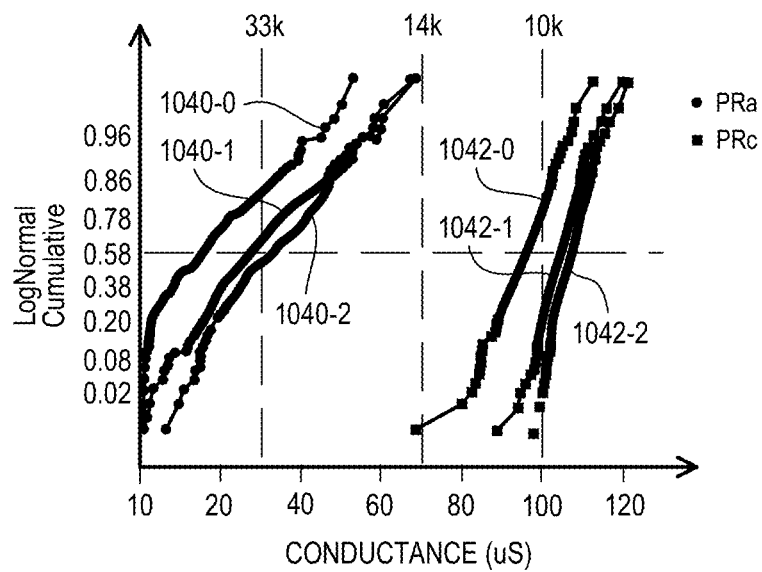

The examples of FIGS. 9A and 9B show CBRAM type RRAM cells that can be programmed into three different resistance states (PRa, PRc, ERa). Such RRAM cells can serve as reliable bits in PUF array. FIGS. 10A and 10B show changes in resistance resulting from conditions that can correspond to changes in resistance over time (e.g., drift).

FIG. 10A is a graph showing resistance distributions of RRAM cells (log normal, cumulative) after being subject to various conditions. The distributions show a low resistance state (PRc), a middle resistance state (PRa) and a high resistance state (ERa). Further, each such state includes an initial distribution, a distribution after a "relaxation" time period of 48 hours and room temperature (condition A), and a distribution after being heated for 20 minutes at 250° C. (condition B). FIG. 10B shows the same distributions as FIG. 10A, but in conductance, and without the ERa distributions.

Referring to FIG. 10A, ERa distributions include an initial distribution 1044-0, ERa after condition A 1044-1, and ERa after condition B 1044-2.

Referring to FIGS. 10A and 10B, PRa distributions include an initial distribution 1040-0, PRa after condition A 1040-1, and PRa after condition B 1040-2. PRc distributions include an initial distribution 1042-0, PRc after condition A 1042-1, and PRc after condition B 1042-2.

PRa distributions can include a higher resistance group 1030 and a lower resistance group 1032. A lower resistance group 1032 can be subject to PRc conditions, to bring them to a lower resistance distribution (e.g., PRc distribution 1038). In such a case, higher resistance PRa group 1032 can serve as high resistance PUF bits. FIGS. 10A and 10B show how PRa resistance values can serve as robust original PUF bits, as data retention for higher resistance bits (i.e., 1030) can be of little or no concern as such bits will drift to a higher resistance over time, reinforcing their state.

Figure 11A:
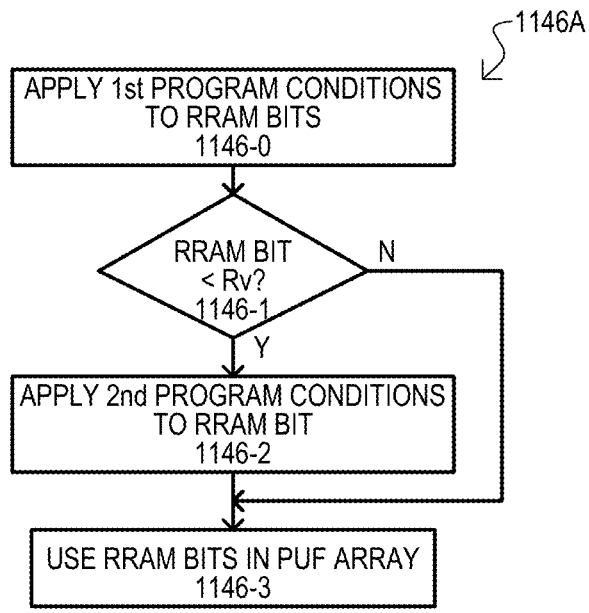
FIGS. 11A and 11B are flow diagrams showing methods of forming essentially random resistance values for bits of a PUF or hash array according to embodiments.

FIG. 11A is a flow diagram of a method 1146A for setting RRAM bits for use in a PUF array according to embodiment. A method 1146A can include applying first program conditions to RRAM bits 1146-0. Such an action can include applying the first program conditions to all bits intended for a PUF array. First program conditions can be selected to create a wide distribution of essentially random resistance values, where the randomness is based on a material property of RRAM cells.

Each RRAM bit can be compared to one or more verify resistance values Rv 1146-1. A verify resistance value can be selected to provide the desired distribution of different resistance states or can be some predetermined value. If an RRAM bit resistance is not less than a verify resistance (N from 1146-1), a method 1146A can include the RRAM bit in a PUF array (as a high resistance state bit) 1146-3.

If an RRAM bit resistance is less than a verify resistance (Y from 1146-1), a method 1146A include applying second program conditions to the RRAM bit 1146-2. The RRAM bit can then be included in the PUF array (as a low resistance state bit) 1146-3.

Figure 11B:
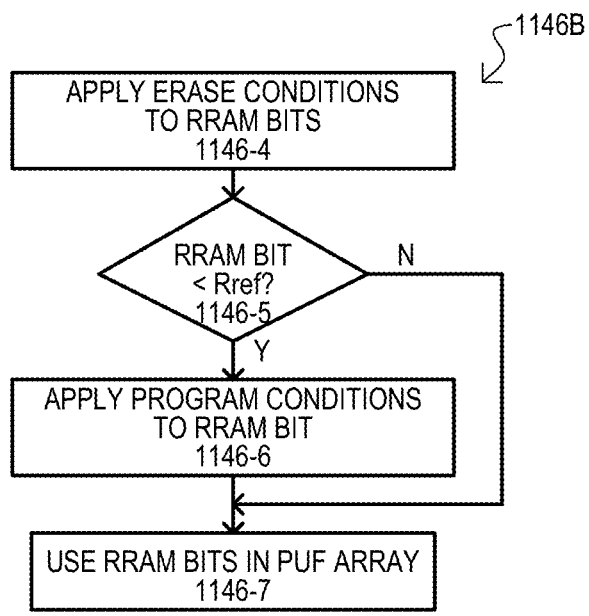

FIG. 11B shows a method 1146B like that of FIG. 11A but using an erase state as an initial distribution. A method 1146B can include applying erase conditions to RRAM bits 1146-4. Such an action can include applying erase conditions to all bits intended for a PUF array. In some embodiments, erase conditions can create essentially random resistance values, where the randomness is based on a material property of RRAM cells.

Each RRAM bit can be compared to one or more verify resistance values Rv 1146-5. A verify resistance value can be selected as in the case of FIG. 11A. If an RRAM bit resistance is not less than a verify resistance (N from 1146-5), a method 1146b can include the RRAM bit in a PUF array (as a high resistance state bit) 1146-7.

If an RRAM bit resistance is less than a verify resistance (Y from 1146-5), a method 1146B include applying program conditions to the RRAM bit 1146-6. In some embodiments, such program conditions can lower the RRAM bit resistance to an even lower, more stable resistance state. The RRAM bit can then be included in the PUF array (as a low resistance state bit) 1146-7.

While embodiments can directly read variations in resistance of an RRAM array as PUF device, other embodiments can include RRAM arrays that are indirect sources of resistance of a PUF device. Examples of such embodiments will now be described.

FIG. 12A to 12D show a PUF device formation according to an embodiment. FIG. 12A shows a RRAM array 1206. An RRAM array 1206 can take the form of any of those described herein, or an equivalent.

FIG. 12B shows RRAM array 1206 being subject to setting conditions. Setting conditions can establish one or more RRAM cell distributions having random/pseudorandom variations in resistance according to any of the embodiments herein, or equivalents. After the application of setting conditions, RRAM array 1206 can be considered a "hash" array.

FIG. 12C shows states of hash array 1248 (created by setting conditions) being transferred (e.g., written) into another device to create PUF array 1208. Thus, the RRAM states of hash array 1248 derived from the random/pseudo-random variations in RRAM cells can be recreated in another device to serve as a PUF array. A PUF array 1208 may or may not be an RRAM array.

FIG. 12D shows an optional operation according to embodiments. Hash array 1206 can be destroyed (i.e., data lost), thus preventing the values of PUF array from being determined from its hash array. Such an action can include setting all RRAM cells to a same state.

Embodiments that utilize a hash array as described herein can address problems that can arise in some approaches that read values from the same RRAM array used to generate the values. For example, some RRAM cells may not reach a desired (e.g., low-resistance state) despite having received one or more forming operations. The retention of such "walking wounded" cells may be worse than if they were truly virgin (i.e., had not received any forming operation). If, for example, a forming algorithm successfully forms 50% of the cells in an array when applied to 100% of the cells, the number of "walking wounded" cells could be 50%.

Other problems can include the lack of remedies for RRAM cells presenting shorts or opens, or the percentage of formed cells might not be the desired amount (i.e., 50% is a typical goal). For some technologies, it is not clear how robust such forming methods might be against process or other (e.g., temperature) variations. Further, such methods may not work well if differential sensing is to be used to read the cells. If, for example, 50% of the cells (at random locations) are formed, then 25% of the differential pairs would both be formed cells and 25% would both be unformed cells. In either case, the two cells of a pair could be too close in resistance, making them prone to read errors or retention errors.

Embodiments that include hash arrays can take any suitable form. FIGS. 13A to 13D show examples of such embodiments. FIG. 13A shows a system 1350A that includes a hash array 1348 and corresponding PUF array 1308 (i.e., a PUF array 1308 having data values corresponding to random/pseudorandom resistance values of hash array 1348) both formed in a same memory cell array 1352. For example, a hash array 1348 can occupy one range of addresses, or a sector, or block, while PUF array 1308 can occupy a different range of addresses, or a sector, or block. Memory cell array 1352 can be formed in an integrated circuit (IC) substrate 1354.

FIG. 13B shows a system 1350B according to another embodiment. A system 1350B can include items like those of FIG. 13B, however, hash array 1348 and PUF array 1308 can be formed in separate memory cell arrays 1352-0 and 1352-1, respectively.

FIG. 13C shows a system 1350C in the form of a IC device 1356 having a hash array 1348 and PUF array 1308 formed on separate IC substrates 1354-0 and 1354-1.

FIG. 13D shows a system 1350D having a hash array 1348 and PUF array 1308 formed in separate IC devices 1356-0 and 1356-1, respectively. The IC devices 1365-0/1 can be connected by a communication path 1358, which may be wired or wireless.

The embodiments of FIGS. 13A to 13D are provided by way of example only. Further, in each of systems 1350A-1350D, upon formation of a PUF array 1308, data within a hash array 1348 can be destroyed as described herein.

Figure 14A:
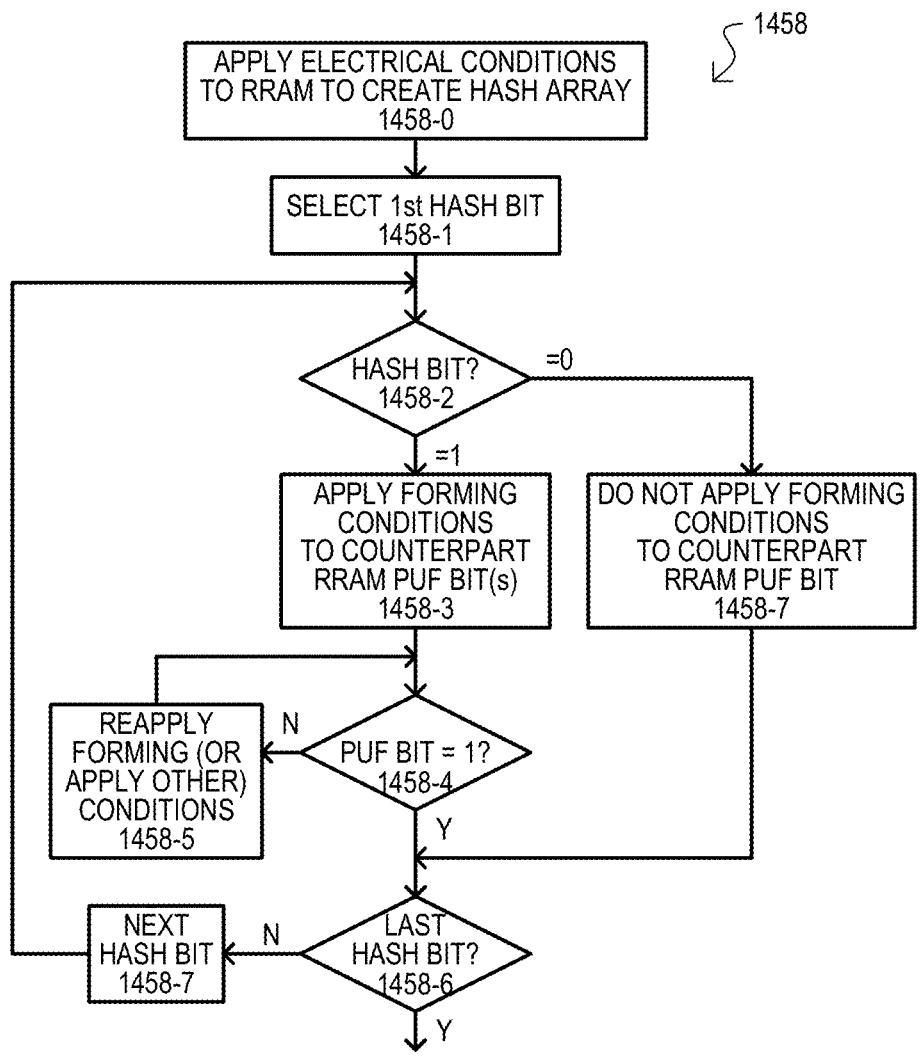
FIGS. 14A to 14C are diagrams showing methods for forming a PUF array from a hash array according to embodiments.

FIG. 14A shows a method 1458 of forming a PUF array from a hash array according to an embodiment. Method 1458 assumes both the hash array and PUF array are formed in RRAM arrays (which can be different RRAM arrays, or parts of a RRAM same array). A method 1458 can include applying electrical conditions to an RRAM array to create a hash array 1458-0. Such an action can include any of those described herein, or equivalents, which can create one or more groups of RRAM cells with essentially random resistance distributions. Such random resistance distributions arise from properties inherent in the RRAM cells, and are not written into the RRAM cells.

A method 1458 can begin at a first hash bit (i.e., a first RRAM cell to be copied over to a PUF array) 1458-1.

A hash bit logic value can be determined 1458-2. Such an action can include comparing a resistance of a hash RRAM cell to one or more verify resistance values. Such a verify resistance value(s) can be selected to divide a resistance distribution into a desired number of logic values (e.g., for a binary PUF response, 50% above Rv, 50% below Rv). In other embodiments, such an action can include determining a logic state of two RRAM cells (i.e., differential sensing).

If the hash bit resistance is equivalent to one logic value (=1 from 1458-2), forming conditions can be applied to counterpart RRAM bit(s) of the PUF array 1458-3. Such an action can include applying electric conditions to set the RAM bits(s) to a desired state with good retention. The PUF bit (subject to the forming conditions) can be checked to ensure it now stores the desired logic value 1458-4. If the PUF bit does not store the desired logic value (N from 1458-4), forming conditions can be reapplied 1458-5. Such an action can include the same forming conditions as 1458-3, but alternate embodiments can include "stronger" conditions (e.g., any of greater current, voltage, duration).

If the hash bit resistance is equivalent to another logic value (=0 in 1458-2), forming conditions are not applied to counterpart RRAM bit(s) of the PUF array 1458-7.

Such operations can continue until a logic value for a last hash bit has been transferred into the PUF array 1458-6 and 1458-7 or until the PUF array has been filled.

While embodiments can include methods for creating PUF arrays that store PUF response bits in single RRAM cells (single ended sensing), alternate embodiments can include the creation of PUF arrays the store response bits with two RRAM cells (differential sensing). One such embodiment is shown in FIG. 14B.

Figure 14B:
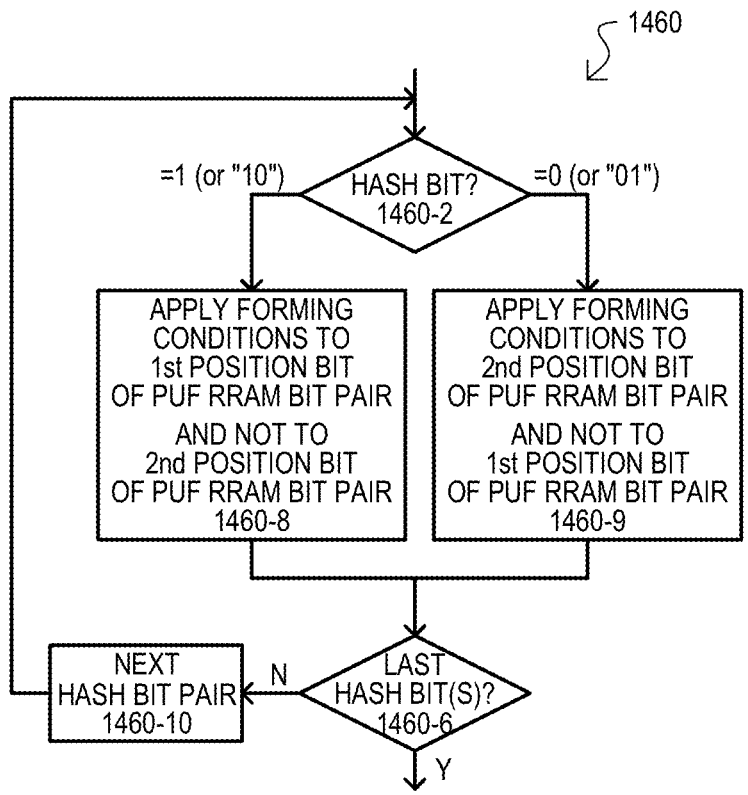

FIG. 14B is a flow diagram of a method 1460 according to another embodiment. In FIG. 14B it is understood that a RRAM array has been subjected to forming conditions to create a hash array. Hash bit logic value can then be determined 1460-2. Such an action can include those noted for 1458-2 of FIG. 14A.

If the hash bit resistance is equivalent to one logic value (=1 or 10 from 1460-2), forming conditions can be applied to a first bit position of a PUF RRAM bit pair, and not to the second bit position of the pair 1460-8. Conversely, if the hash bit resistance is equivalent to another logic value (=0 or 01 from 1460-2), forming conditions can be applied to a second bit position of a PUF RRAM bit pair, and not to the first bit position of the pair 1460-9.

Such operations can continue until a logic value for a last hash bit has been transferred into the PUF array 1460-6, 1460-10.

Figure 14C:
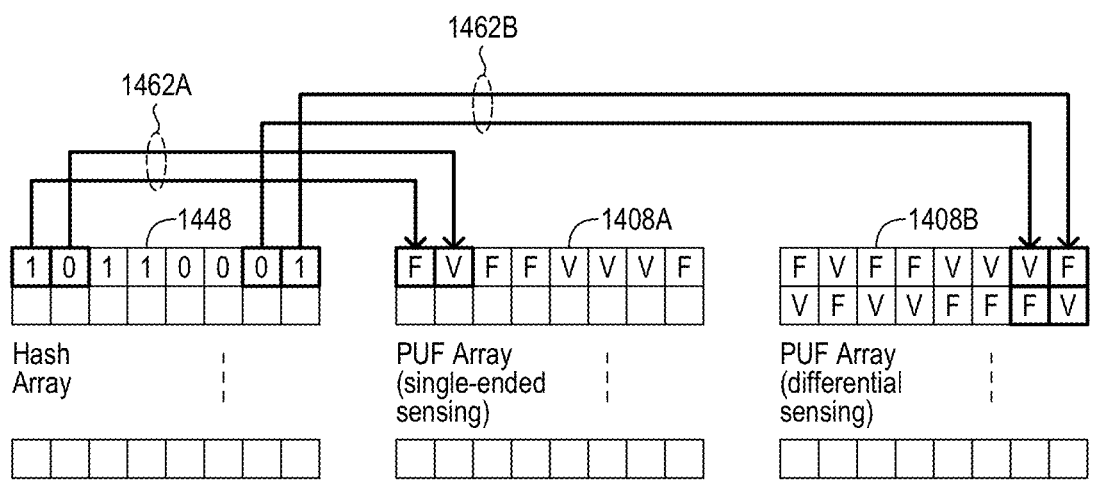

FIG. 14C is a diagram showing operations like those indicated in FIGS. 14A and 14B. FIG. 14C shows a hash array 1448, a first PUF array 1408A and a second PUF array 1408B. A hash array 1448 can be an RRAM array with RRAM cells having an essentially random resistance distribution. Such resistance values can be evaluated as either a 1 or a 0. Binary values of hash array 1448 can be transferred by operation 1462A to another RRAM array to create first PUF array 1408A. In the example shown, for each hash bit having a "1", a corresponding RRAM cell in PUF array 1408A can be subjected to forming conditions (F). For each hash bit having a "0", a corresponding RRAM cell PUF array 1408A can remain in an initial (i.e., virgin) state (V). Operation 1462A can be one example of that shown in FIG. 14A.

PUF array 1408B can utilize differential sensing and thus store binary values with two RRAM cells. Accordingly, binary values of hash array 1448 can be transferred by operation 1462B to another RRAM array to create second PUF array 1408B. In the example shown, for a hash bit having a "1", a corresponding RRAM cell pair can have a first RRAM cell subject to forming conditions (F), while the second remains in the initial state (V). For a hash bit having a "0", a corresponding RRAM cell pair can have a first RRAM cell remain in the initial state (V) while the second bit is subject to forming conditions (F).

In some embodiments a read method to a hash array can be the same as that to the corresponding PUF array. However, in other embodiments, a read method to a hash array can be different from that used to access the corresponding PUF array.

According to embodiments, a PUF array (whether created with a hash array or not) can include error detection/correction and/or redundancy schemes. Such error detection/correction or redundancy can take any suitable form. Some particular, but non-limiting examples will now be described with reference to FIGS. 15A to 16B.

Figure 15A:
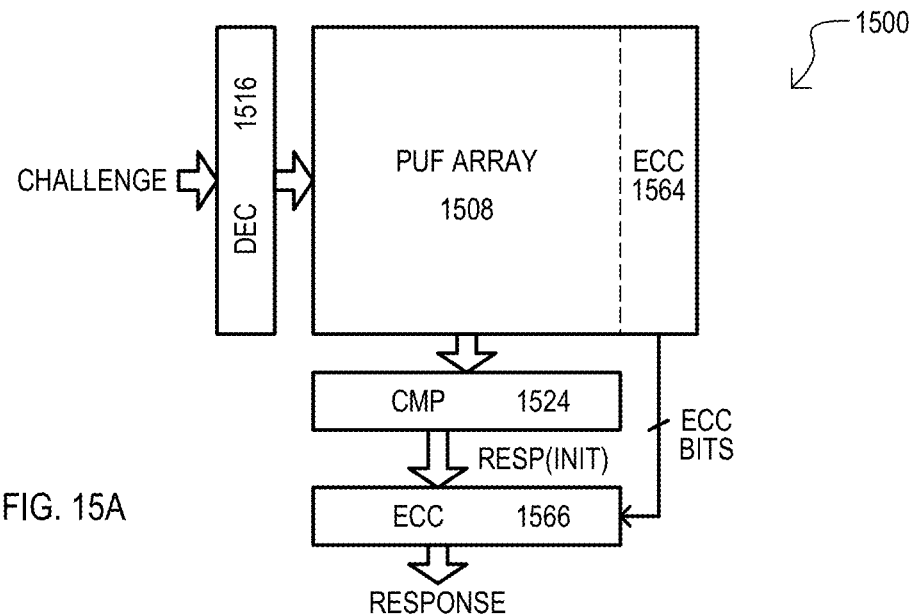
FIGS. 15A to 15C are diagrams of PUF devices and operations that utilize error correction and/or detection (ECC) data according to embodiments.

FIG. 15A shows PUF 1500 according to an embodiment. A PUF 1500 can include features like those shown in FIG. 5A. In addition, a PUF 1500 can include an error code portion 1564. Error code portion 1564 can include error detection or correction bits (referred to herein as ECC bits) corresponding to RESPONSEs generated from CHALLENGEs.

In operation, a PUF 1500 can receive a RESPONSE and apply to PUF array 1500 to access storage cells. Compare circuit 1524 can generate an initial response value RESPONSE(INIT) as well as corresponding ECC BITS. An ECC circuit 1566 can evaluate RESPONSE(INIT) using the corresponding ECC BITS for any errors. If an error is detected the error can be corrected (if possible) or signaled (if not corrected or not correctable).

Figure 15B:
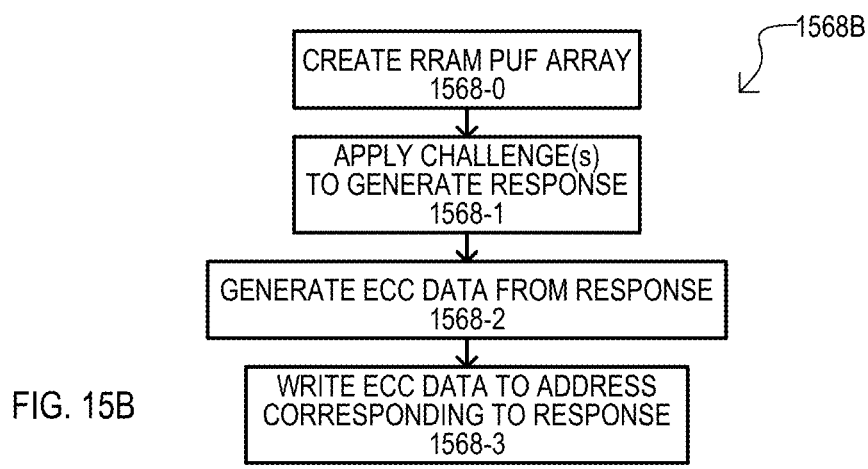

FIG. 15B is a flow diagram of a method 1568B of generating ECC data for REPONSE values according to an embodiment. A method 1568B can include creating an RRAM PUF array 1568-0. Such an action can include any of those described herein, including methods using a hash array. Challenges can be applied to the PUF array to generate responses 1568-1. ECC data can be generated from the responses 1568-2. The ECC data can then be written into an address corresponding to the response 1568-3.

It is noted that in the case of a hash array approach, a method may not include 1568-0/1. Rather, as response data from the hash array is being transferred from into the PUF array, ECC data can be generated and then written with the response data into the PUF array.

Figure 15C:
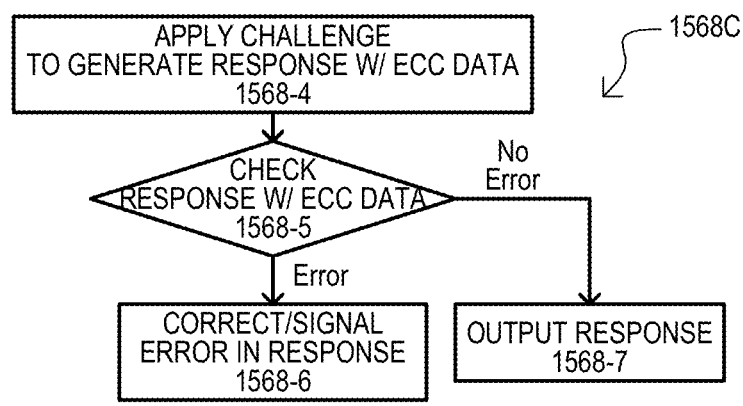

FIG. 15C is a flow diagram of a method 1568C of correcting response values with ECC data according to an embodiment. A method 1568C can include applying a challenge to generate a response with corresponding ECC data 1568-4. The response can be checked for errors with the ECC data 1568-5. If no error is found (No Error from 1568-5), a method can output the response. If an error is found (Error from 1568-5), a method can correct the response (if possible), or signal the response has an error.

Figure 16A:
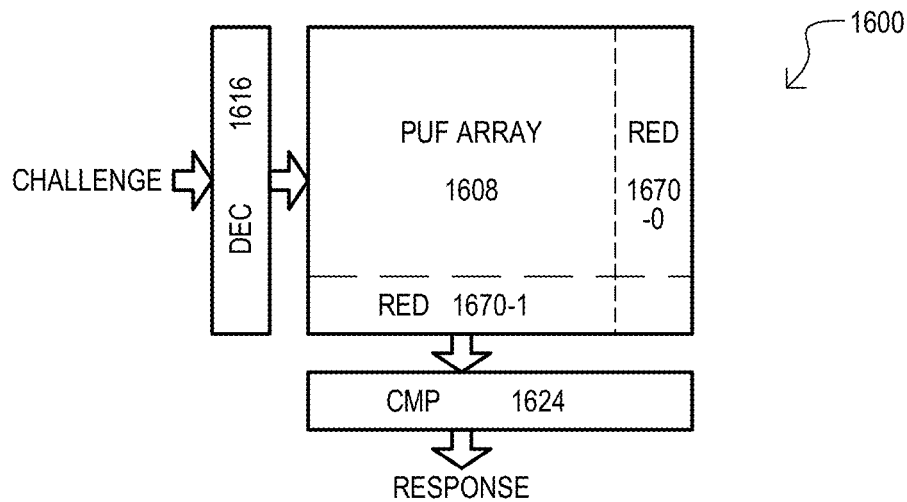
FIGS. 16A and 16B are diagrams of PUF devices and operations that utilize redundancy according to embodiments.

FIG. 16A shows PUF 1600 according to another embodiment. A PUF 1600 can include features like those shown in FIG. 5A. In addition, a PUF 1600 can include redundant portions 1670-0/1. Redundant portion 1670-0 can be redundant columns, and thus addressable by a same row address portion of CHALLENGE inputs. Redundant portion 1670-1 can be redundant rows, and thus addressable by a same column address portion of CHALLENGE inputs. The overlapping area of redundant portions 1670-0/1 can enable the replacement of CHALLENGE input.

In the event a PUF 1600 serves as a hash array, or is formed without a hash array (i.e., its own variability in RRAM cells resistance is read to generate a RESPONSE), the inherent randomness/pseudo randomness of redundant cells resistance can be used to generate response values. If the PUF 1600 is created with a hash array, redundant cells can be written with the desired response values.

Figure 16B:
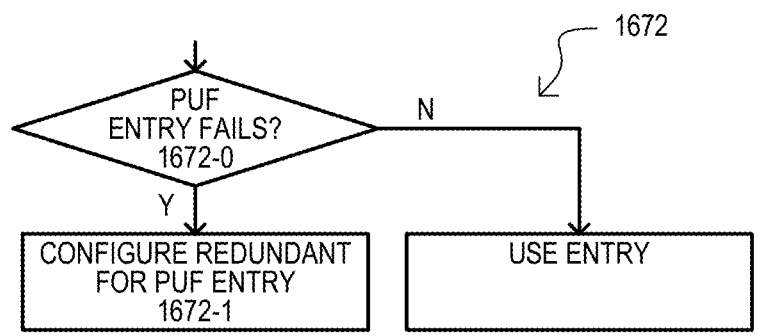

FIG. 16B shows a method 1672B of replacing defective PUF entries according to an embodiment. A method 1672B can include determining if PUF entry fails 1672-0. A PUF entry can be storage locations accessed by a challenge to output a response. A PUF entry failure can be detected in any suitable fashion, and can include, but is not limited to: a PUF entry giving unreliable values (e.g., resistance too close to a verify resistance, or differential resistance values not sufficient different), a PUF entry being not being writable or retaining a desired value, or a PUF entry indicating an error or not being correctable with ECC data.

If a PUF entry fails, a redundant entry can be configured as a replacement for a failing entry 1672-1. As noted above, in some embodiments, the inherent resistance variability of the replacement entry can be used to generate a response. However, in other embodiments a response value from another source (e.g., a hash array) can be written into the redundant entry.

As fabricated, PUF arrays formed with some technologies may include RRAM cells that are shorted (e.g., in a low resistance state that cannot be changed by operations) or open (e.g., in a high resistance state which may not form in response to an application of forming or other conditions).

If a PUF array is to be read using differential sensing, the presence of shorts and opens may result in both cells of a differential pair being in a low-resistance state (LRS) or high-resistance state (HRS). For example, if a differential bit in a RRAM PUF array is to be written as F/V (Formed/Virgin), but the second cell (the V) is shorted, then the differential pair will be F/S (Formed/Short). This may make the bit prone to read errors, due, for example, to the resistance of the two cells being too close in value to be reliably resolved.

For PUFs that use single ended sensing of RRAM cells, shorts or opens that conflict with intended values can be addressed with redundancy as described herein (e.g., FIGS. 16A/B).

According to embodiments, in a PUF array using differential sensing, RRAM cells can be checked for shorts or opens. If a short or open is detected, its resistance value can be used to establish a desired state (e.g., LRS or HRS), and the RRAM cell can be used in the differential pair.

Figure 17A:
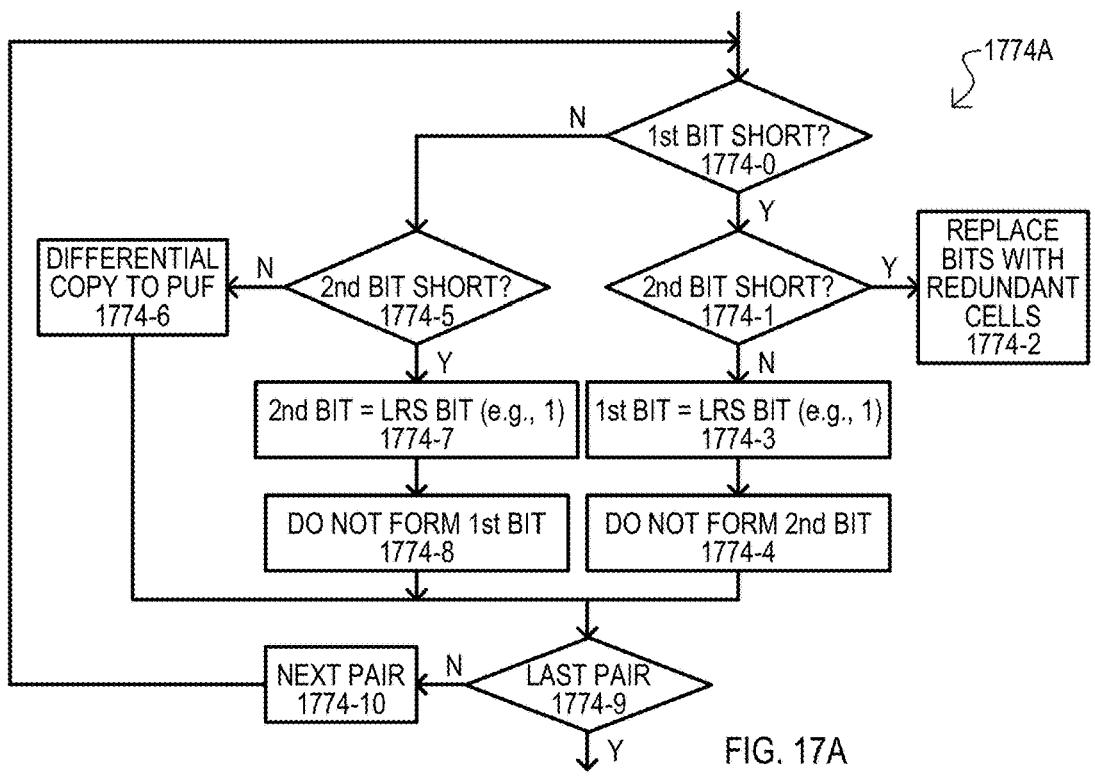
FIGS. 17A and 17B are flow diagrams showing methods of addressing short or open conditions in resistance elements of a hash or PUF array according to embodiments.

FIG. 17A is a flow diagram of a method 1774A for addressing RRAM cell shorts in a PUF having differential sensing. A method 1774A can include checking a first bit of an RRAM cell differential pair for a short conditions 1774-0. If a short is detected in the first bit (Y from 1774-0), the second bit of the RRAM pair can be checked for a short (1774-1). If the second bit is also a short (Y from 1774-1), a method 1774A can replace the RRAM pair with redundant RRAM cells 1774-2.

If the second bit is not also a short (N from 1774-1), a method 1774A can assign the first bit as the LRS bit of a differential pair 1774-3. Further, forming conditions will not be applied to the second bit of the differential pair 1774-4. Such an action can ensure the second bit will remain in the HRS state.

If a short is not detected in the first bit (N from 1774-0), the second bit of the RRAM pair can be checked for a short (1774-5). If the second bit is also not a short (N from 1774-5), a method 1774A can program/write the differential pair in a conventional manner 1774-6 (e.g., one bit formed for LRS, the other bit not formed for HRS).

If the second bit is a short while the first bit is not a short (Y from 1774-5), a method 1774A can assign the second bit as the LRS bit of a differential pair 1774-7. Further, forming conditions will not be applied to the first bit of the differential pair 1774-8 (ensuring the first bit will remain in HRS).

Such actions can continue until a last RRAM differential pair is reached 1774-9, 1774-10.

Figure 17B:
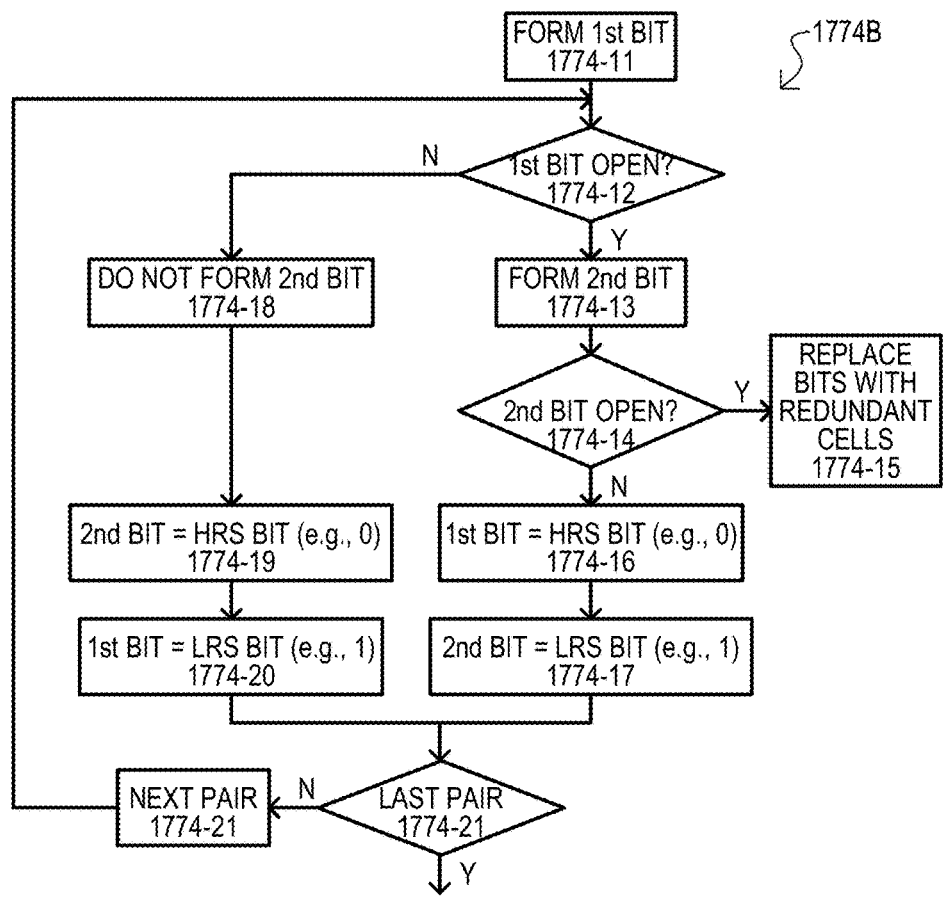

FIG. 17B is a flow diagram of a method 1774B for addressing RRAM cell opens in a PUF having differential sensing. A method 1774B can include applying forming conditions to a first bit 1774-11. If the first bit is an open (despite the forming step) (Y from 1774-12), forming conditions can be applied to the corresponding second bit 1774-13. If the second bit is also an open (Y from 1774-14), a method 1774B can replace the RRAM pair with redundant RRAM cells 1774-15.

If the second bit is not also an open (N from 1774-14), a method 1774A can assign the first bit as the HRS bit of a differential pair 1774-16. The second bit can be the LRS bit of the differential pair 1774-17. In some embodiments further operations can be performed on the LRS bit (e.g., its resistance decreased further).

If the first bit is not an open (N from 1774-11), a method 1774B cannot apply forming conditions to the second bit 1774-18. The second bit can be assigned as the HRS bit of a differential pair 1774-19 and the first bit can be the LRS bit of the differential pair 1774-20. In some embodiments further operations can be performed on the LRS bit (e.g., its resistance decreased further).

Such actions can continue until a last RRAM differential pair is reached 1774-21, 1774-22.

Figure 18A:
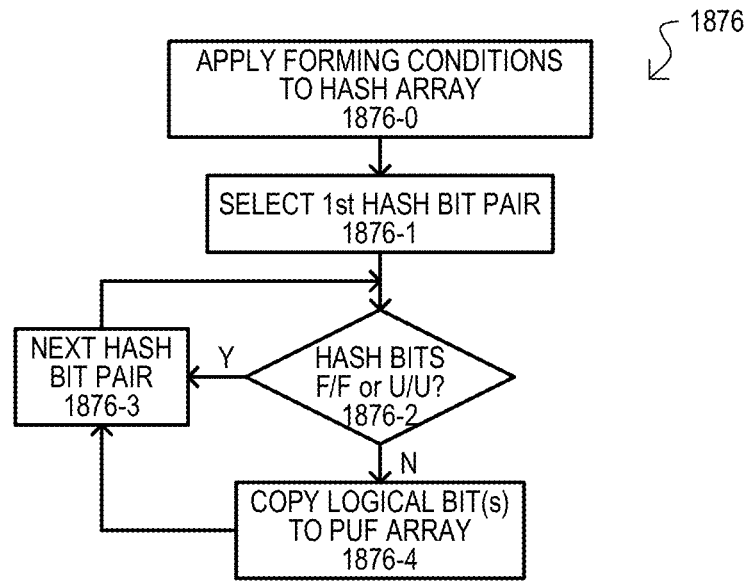
FIGS. 18A and 18B are diagrams showing methods of transferring data from a hash array to a PUF array according to embodiments.
Figure 18B:
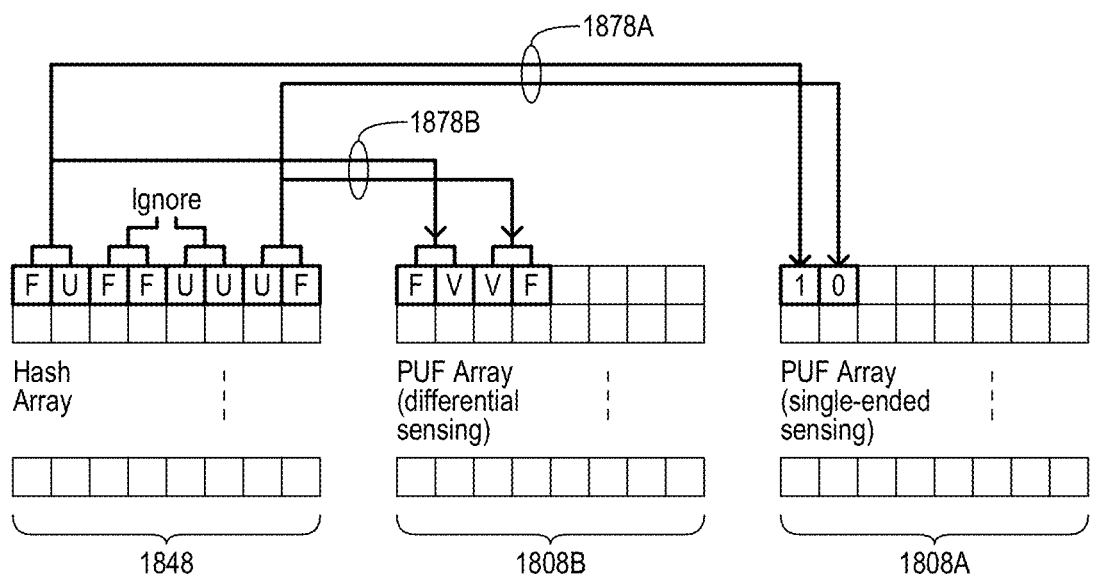

According to embodiments, cell pairs of a RRAM hash array that display complementary states can be used to program a PUF array. In particular, electrical conditions (e.g., forming conditions) can be applied to an RRAM hash array that selected to generate a desired distribution (e.g., 50%) of RRAM cells having different states (e.g., formed or unformed). If a selected RRAM cell pair consists of RRAM cells of different states, it can be used to program a PUF array. If a selected RRAM cell pair consists of RRAM cells of the same state, the pair is not used to program a PUF array (i.e., the pair is skipped over and the next pair examined). FIGS. 18A and 18B are diagrams showing examples of such an embodiment.

FIG. 18A is a flow diagram of a method 1876 according to an embodiment. A method 1876 can include applying a forming operation to cells in a hash array 1876-0. Such an action can include apply electrical conditions that can result in cells being formed (e.g., having a lower resistance) or unformed (remain in a high resistance) in an essentially random fashion based on inherent features. A method 1876 can then being selecting pairs of cells in the hash array, starting with a first pair 1876-1.

The selected pair of cells can be examined to determine their state 1876-2. Such an action can include performing a read operation to determine if zero, one, or two of the cells of the pair are formed (e.g., have a low resistance). If the two cells of a selected pair are both formed (F/F) or both unformed (U/U), a next pair of cells can be selected 1876-3 (e.g., ignore the current pair).

If the selected pair have different states (e.g., F/U, U/F), the corresponding logical bit(s) can be written into a PUF array 1876-4. For example, if the pair is F/U, this can be considered a logic 1, and a logic 1 can be written into the PUF array. Conversely, if the pair is U/F, is can be considered it to be a logic 0, and a logic 0 can be copied into the PUF array. Alternatively, U/F may be considered to be a logic 1 and F/U may be considered to be a logic 0.

How logic values from differential hash array are written into a PUF array can differ according to whether the PUF array uses single-ended or differential sensing. If a PUF array is to be read using differential sensing, a logical 1 (e.g., F/U) from a hash array can mean the first cell of the differential pair is subject to forming conditions while the second cell remains unchanged (i.e., virgin), which can be represented by F/V. A logical 0 (e.g., U/F) from a hash array can mean the second cell of a differential pair is subject to forming conditions while the first cell remains unchanged, which can be represented by V/F. Alternatively, the opposite meanings may be used (i.e., logic 1=V/F, logic 0=F/V).

If a PUF Array is to be read using single-ended sensing, one logic value (i.e., l/0) can mean the corresponding PUF array bit is not subject to forming conditions, while the other logic value (i.e., l/0) can mean the corresponding PUF array bit is subject to forming conditions.

Programming of a PUF array using hash array values can continue the manner noted herein until the PUF array is fully populated with a desired distribution (e.g., random distribution of 50% logic 1, 50% logic 0). Such actions can include using more than one hash array to fill a PUF array.

FIG. 18B is a diagram showing operations like those indicated with respect to FIG. 18A. FIG. 18B shows a hash array 1848, a first PUF array 1808A and a second PUF array 1808B. A hash array 1848 can be an RRAM array with RRAM cells having an essentially random resistance distribution of formed (F) and unformed (U) RRAM cells. Pairs of cells in hash array 1848 can be examined, and if they are in different states, written into a PUF array (i.e., 1808A and/or 1808B) as particular logic values. Pairs of cells in hash array 1848 having the same state can be skipped.

Referring still to FIG. 18B, in hash array 1848 a first pair of cells (going from left to right) have states F/U. In the case of a single-ended sensing PUF array 1808A, operation 1878A can be used to represent the hash array state (F/U) as a logic "1". In contrast, in the case of differential sensing PUF array 1808B, operation 1878B can be used to form a first cell and not form a second cell, to create a formed and virgin pair (F/V).

A next pair of cells can be examined in hash array 1848. Because the pair has the same state F/F, the pair can be skipped and not represented in a corresponding PUF array (1808A or 1808B). The next pair is also of the same state (U/U) so it is skipped as well.

The fourth pair of hash array cells can have states U/F. In the case of a single-ended sensing PUF array 1808A, operation 1878A can be used to represent the hash array state (U/F) as a logic "0". In contrast, in the case of differential sensing PUF array 1808B, operation 1878B can be used to form a second cell and not form a first cell, to create a virgin and formed pair (V/F).

While embodiments can select adjacent pairs hash cells in a row-wise fashion, alternate embodiments can step through a hash array in any of various other ways. Such embodiments can reduce the number of hash cell pairs that are skipped over as compared to an approach like that of FIG. 18B. Examples of such embodiments will now be described.

Figure 19A:
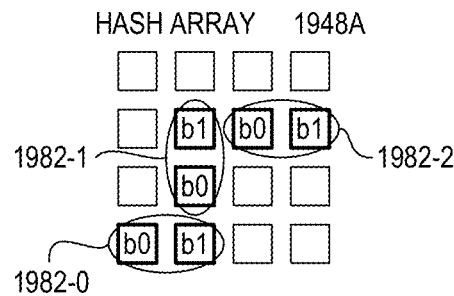
FIGS. 19A to 19C are diagrams showing various ways to step through a hash array to select values for transfer to a PUF array according to embodiments.

FIG. 19A shows a method of selecting hash array pairs according to an embodiment. FIG. 19A shows a portion of a hash array 1948A. A first hash cell pair 1982-0 can be selected. In the example shown, first pair 1982-0 can be adjacent cells in a first (e.g., row-wise) direction. However, a second pair 1982-1 can be selected by stepping in different direction (e.g., column-wise). A third pair 1982-2 can be selected by stepping in a different direction than the previous pair, which in the embodiment shown, can be in the first direction. However, a third pair 1982-2 could be selected by going in yet a different direction.

Figure 19B:
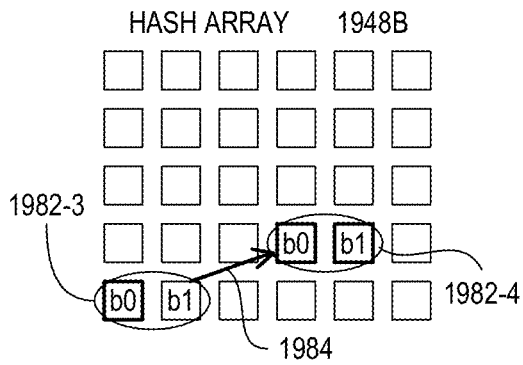

FIG. 19B shows another method. Pairs of hash array cells can be selected stepping through a hash array 1948B multiple times at angles that may not be orthogonal to one another. For example, after selecting pair 1982-3, pair 1982-4 can be selected by moving at an "angle" 1984 (i.e., over three, up one).

Figure 19C:
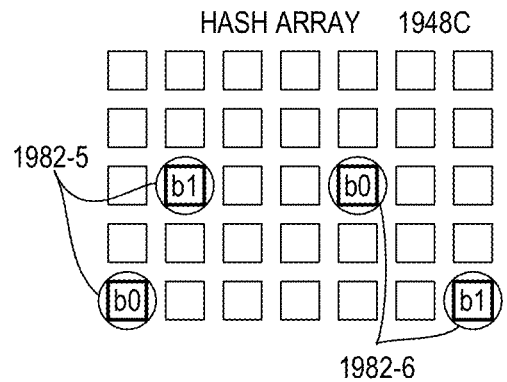

FIG. 19C shows a method that includes stepping through a hash array 1948C multiple times, selecting pairs composed of cells that are different physical or logical distances apart. For example, pair 1982-5 can be composed two cells having a first physical/logical distance, while pair 1982-6 can be composed of two cells having a second physical/logical distance.

While embodiments can include deterministic methods where arrays are stepped through based on set values or algorithms, alternate embodiments can include random number generators RNGs, or the like, to introduce essentially random steps into address selection. Examples of such embodiments are shown in FIG. 20.

Figure 20:
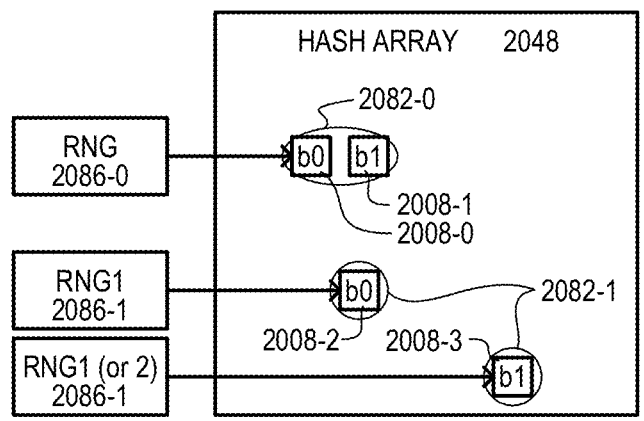
FIG. 20 is a diagram showing devices and methods for selecting hash array values for transfer into a PUF array according to embodiments.

FIG. 20 shows a hash array 2048 in which hash cell pairs can be selected using a random number generator (RNG). For example, RNG 2086-0 can be used to choose an address to select a first cell 2008-0. A neighboring cell 2008-1 can be considered the second cell of the hash pair 2082-0. While FIG. 20 shows second cell 2008-1 as a row-wise neighbor, a second cell 2008-1 could be a neighbor in another direction, or neighbor at some angle, or other logical/physical distance from cell 2008-0. In other embodiments hash pairs can be selected by using one or more random number generators 2086-2 for two addresses, then taking the two cells corresponding to the addresses 2008-2/3 (or cells neighboring them) to be a hash pair 2082-1. In approaches like those of FIG. 20, random address values can be continued to be used such that a same cell in a hash array may contribute to more than one hash pair.

Figure 21A:
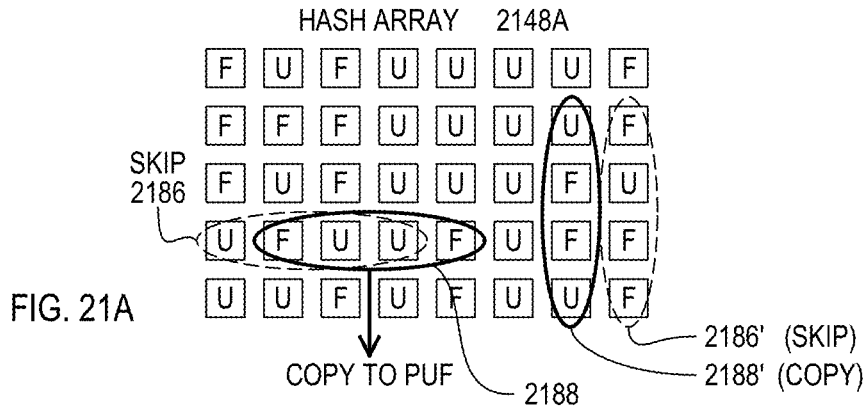
FIGS. 21A and 21B are diagrams showing methods for selecting hash array values of greater than 2 bits for transfer into a PUF array according to embodiments.

According to embodiments, instead of selecting pairs of cells from a hash array for transfer into a PUF array, cells can be selected in units of 2N cells, where N is an integer greater than 1. If there are N ones and N zeros in a unit of 2N cells, then that unit could be copied into a PUF Array. FIG. 21A shows an example of such an embodiment. Within hash array 2148A, 2N cells are selected, where N=2. A group 2186 includes three cells of state U, and so is not selected. Group 2188 includes two cells of state U and two cells of state V, and so is selected. Unselected group 2186' and selected group 2188' show how groups can have various orientations (e.g., vertical instead of horizontal).

Figure 21B:
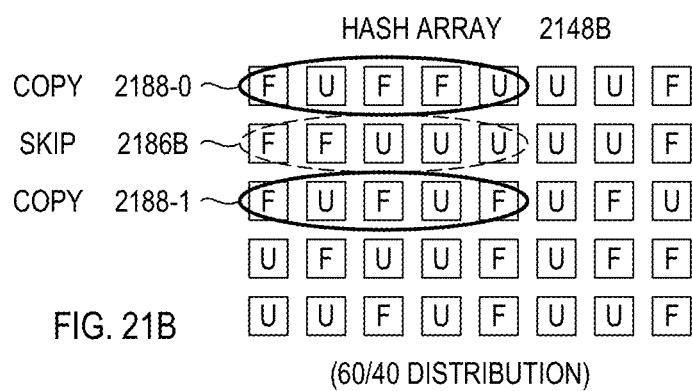

Groups of hash array cells can also be selected to arrive at different distributions. For example, if a PUF Array is intended to have approximately P % of 1s and approximately (1-P) % of 0s, cells could be selected from a hash array in units of N cells. If approximately P % of cells in a unit are logical 1s, that unit can be copied into a PUF array. FIG. 21B shows an example of such an embodiment. Within hash array 2148B, N cells are selected, where N=5. Further it is desired to have and 60/40 distribution of 1s/0s in a resulting PUF array. Groups 2188-0/1 includes 60% of their cells in the state F, and so are selected. Group 2186-0 does not include 60% of its cells in state F, and so is not selected.

It is understood that groups of hash array cells in embodiments like those of FIGS. 21A/B can be selected any suitable stepping method, including those disclosed herein and equivalents.

Embodiments can also utilize the variability in forming operations to establish a distribution for use as a hash array or PUF array. An example of such an embodiment will be described with reference to FIG. 22.

Figure 22:
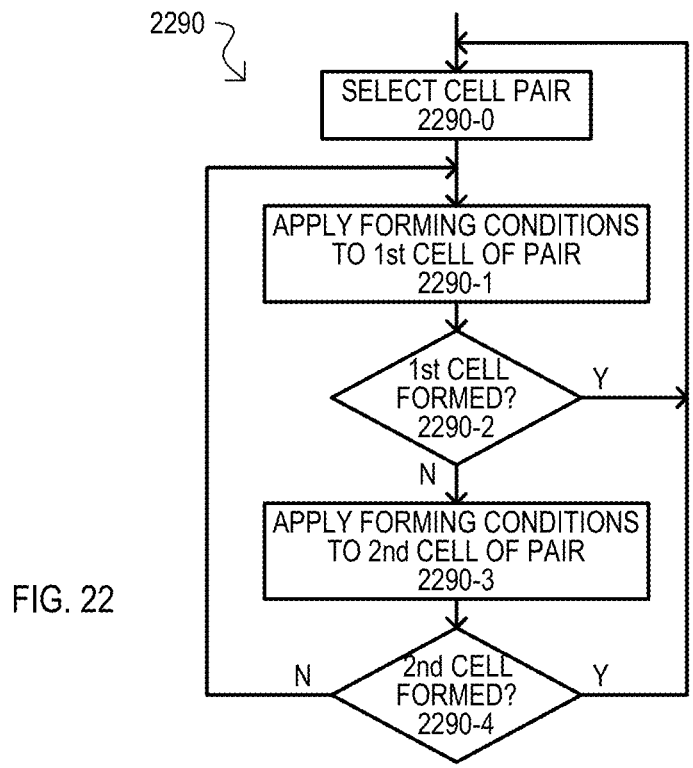
FIG. 22 is a flow diagram of a method for establishing logic values in a hash or PUF array according to embodiments.

FIG. 22 is a flow diagram of a method 2290 for establishing a predetermined distribution (in the example shown 50/50) of binary values for PUF and similar applications. A method 2290 can include selecting two cells from an array 2290-0. Such an action can include any of those described herein or equivalents. Forming conditions can be applied to a first cell of the pair 2290-1. Such an action can include forming conditions that have only a limited chance (i.e., ideally 50%) of placing the cell in the formed state.

The first cell subject to the forming conditions can be evaluated to determine if it has formed (i.e., is in the formed state) 2290-2. If the evaluated cell is in the formed state (Y from 2290-2) a next cell pair can be selected (return to 2290-0). If the evaluated cell is not in the formed state (N from 2290-2) the forming conditions can be applied to the second cell of the pair 2290-3. The second cell subject to the forming conditions can be evaluated to determine if it has formed 2290-4. If the second cell is in the formed state (Y from 2290-4) a next cell pair can be selected (return to 2290-0). If the second cell is in not in the formed state (N from 2290-4), a method 2290 can return to 2290-1 (i.e., try again to form the first cell).

It is understood that cells having states set in a manner like that of FIG. 22 can be cell pairs that each store a data value read using differential sensing. However, such cells can also be individual cells read using single-ended sensing.

It is also understood that cells having states set in a manner like that of FIG. 22 can serve as a PUF array, with cells being accessed by challenge inputs to generate a response. However, such cells can also serve as a hash array, having the data values transferred to another array to form a PUF array.

While FIG. 22 shows an arrangement in which cells have a 50/50 distribution, alternate embodiments can include a counting step to arrive at percentages other than 50/50. For example, each cell of a group can be subject to forming conditions until the given percentage of formed cells is arrived at. If the percentage is not reached in a first pass, another pass can be made.

While embodiments show response values generated from data at an address accessed by a challenge value, according to other embodiments, a response can be generated from data stored at other locations based on an address specified by a challenge value. Various examples of such embodiments will now be described.

Figure 23A:
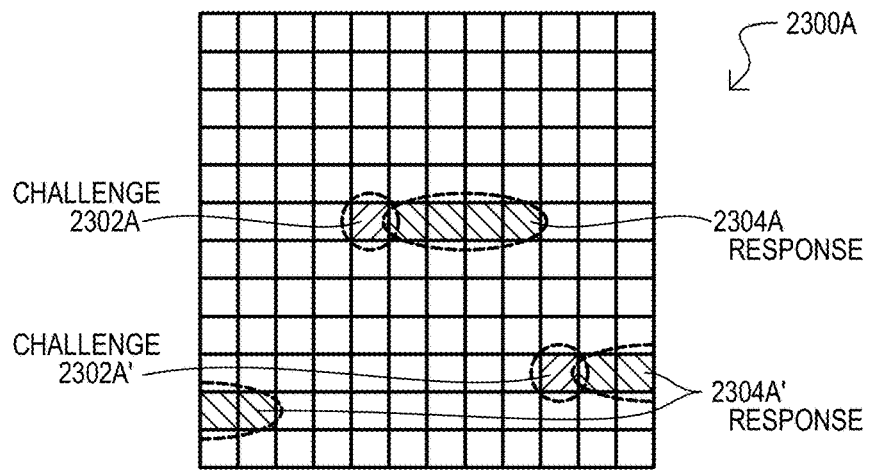
FIGS. 23A to 23F are diagrams showing variations in generating response values from challenge address values according to embodiments.

Referring to FIG. 23A, in a PUF array 2300A a challenge 2302A can access an address as shown. However, a response 2304A can be a string of k cells physically or logically adjacent to the address of the challenge 2302A. In some embodiments, responses to challenges can "wrap" around logical or physical ends of a storage space. For example, in FIG. 23A, challenge 2302A' can result in a response 2304A' that occupies the end of one row and the start of a next row.

Figure 23B:
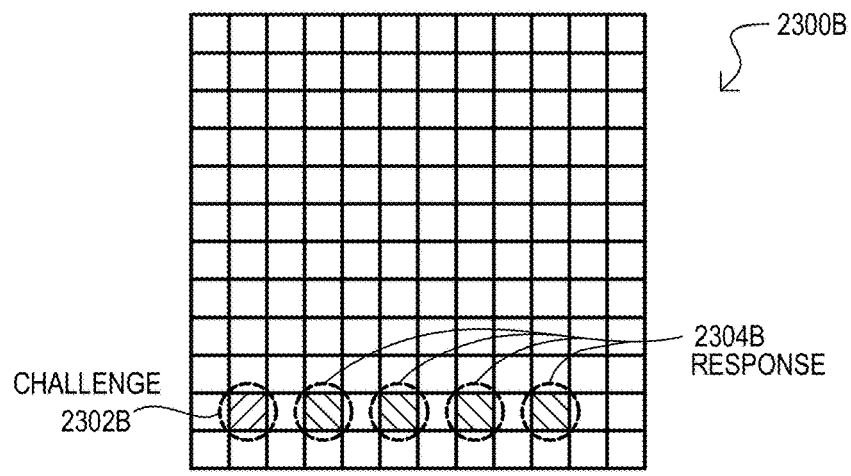
Figure 23C:
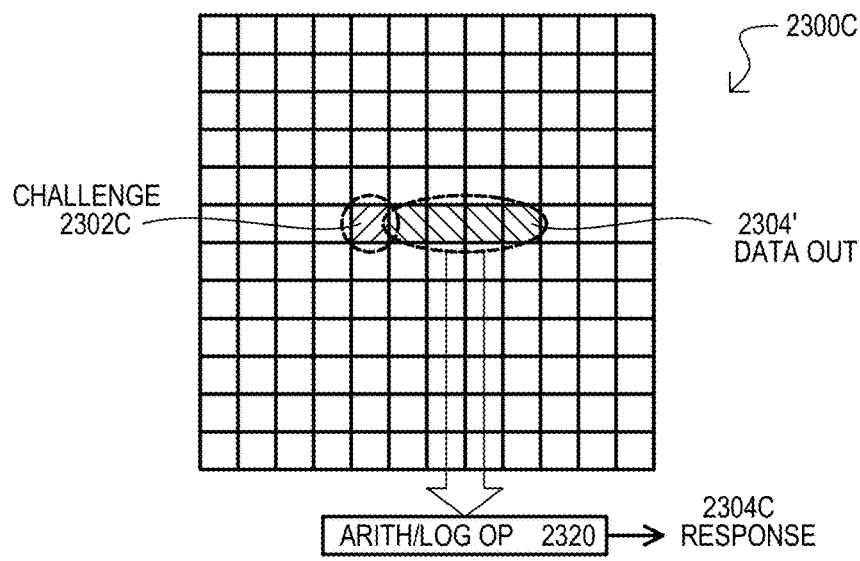

Referring to FIG. 23B, in a PUF array 2300B, in response to a challenge 2302B, a response 2304B can include data stored in cells at noncontiguous addresses. In a response comprising noncontiguous addresses, more than one address may be skipped in between the selected addresses. In some embodiments, a number of cells to be skipped may be specified in a challenge. Noncontiguous addresses can be arrived at in a deterministic manner, or, as will be described in embodiments below, a non-deterministic manner (e.g., essentially randomly based on a seed value).

In some embodiments, a response can be the result of a logical and/or arithmetic operation performed on data accessed by a challenge. For example, referring to FIG. 23C, in response to a challenge 2302C data values 2304' can be accessed at k cells physically or logically adjacent to an address specified in a challenge 2302C. Such data values 2304' can be applied to a function block 2320. Function block can execute one or more logic or arithmetic functions on the received data values to arrive at response 2304C. In a particular embodiment, a response can be a sum of the logical (0 or 1) values stored in k cells physically or logically adjacent to an address specified in a challenge.

In some embodiments a challenge can include a physical or logical direction from which response cells can be selected from a PUF Array. For example, referring to FIG. 23D, depending upon a value of challenge 2302D, a response 2304D-0 in a first vertical direction can be selected, or a response 2304D-1 in a second vertical direction can be selected. As another example, a challenge beginning with a '0' can indicate that response cells are to be selected from cells in a vertical direction from an address specified in the challenge, whereas a challenge beginning with a '1' may indicate that the response cells are to be selected from cells in a horizontal direction.

In some embodiments a challenge can include an angle, that is not vertical or horizontal, from which response cells are to be selected. For example, referring to FIG. 23E, a challenge 2302E can correspond to an address, but a response 2304E can be selected from addresses extending at an angle with respect to the address of the challenge 2302E.

In some embodiments a challenge can present bounds in an address space (logical of physical) from which response data is generated. For example, referring to FIG. 23F, a challenge 2302F can include "vertex" addresses which access three locations as shown. A response 2304F can be generated at cells corresponding to addresses between those indicated by the challenge 2302F.

According to embodiments, PUF arrays can also include "nonce" values. Nonce values can record whether a particular response has been provided previously. In some embodiments, nonce values may be stored in a portion of a PUF array.

While responses can be generated from data stored at locations in a deterministic manner, in other embodiments addresses for response values can be derived in non-deterministic manner. Various examples of such embodiments will now be described.

Figure 24:
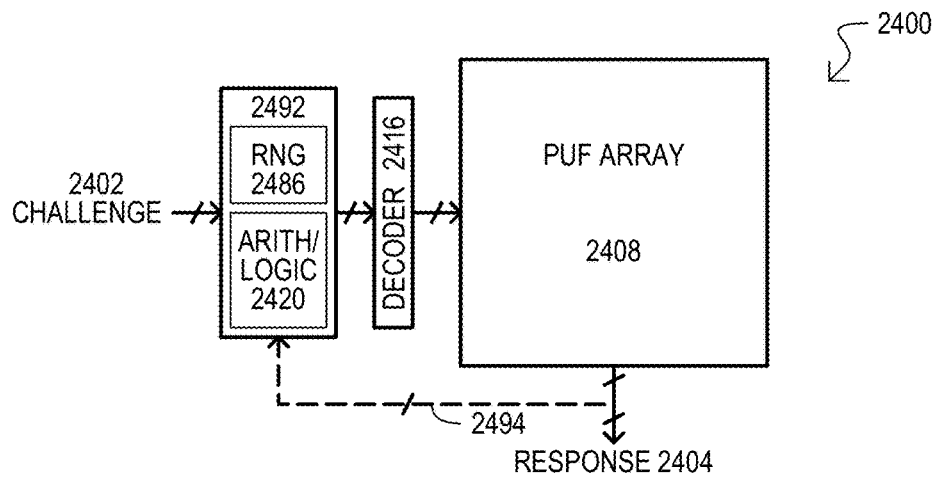
FIG. 24 is a block diagram showing a PUF device that can include a random number generator (RNG) when applying challenge values to a PUF array according to an embodiment.

Referring to FIG. 24, a PUF device 2400 according to an embodiment is shown in a block diagram. A PUF device 2400 can include a PUF array 2408, a challenge modifier 2492, a decoder 2416, and optionally, a response feedback path 2494. A PUF device 2400 can operate like that shown in FIG. 4A, however, a challenge modifier 2492 can include a RNG 2486, which can generate essentially random values in response to seed values. Thus, addresses to PUF array 2408 can be generated all, or in part, by a RNG 2486. RNG 2486 can be seeded with all or portions of a challenge 2403, a response 2404, or combinations thereof.

Figure 25A:
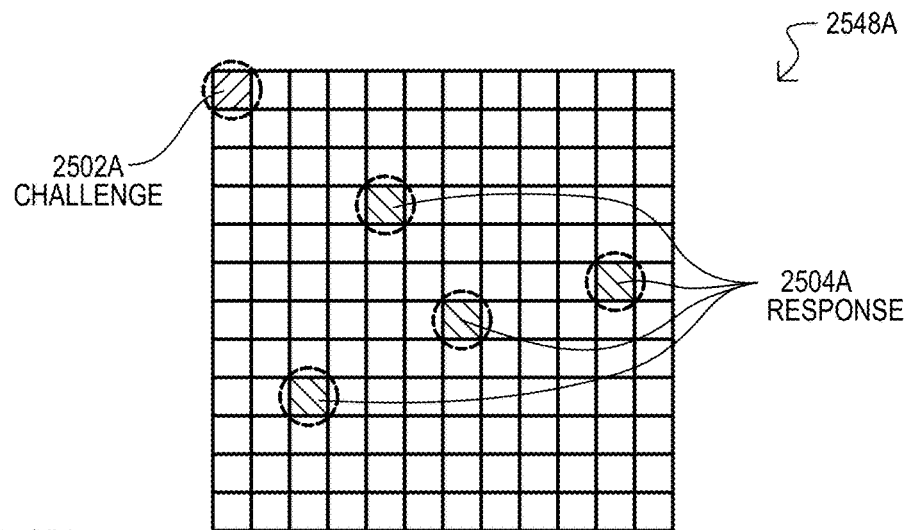
FIGS. 25A to 25D are diagrams showing the generation of response values with the use of a RNG according to embodiments.

FIG. 25A shows operations in a PUF array 2548A according to an embodiment. A challenge 2502A can be applied that would access the location noted. However, all or a portion of a challenge 2502A can serve as a seed value to a RNG. The RNG can generate a number of addresses at the noted locations, to generate a response value 2504A.

Figure 25B:
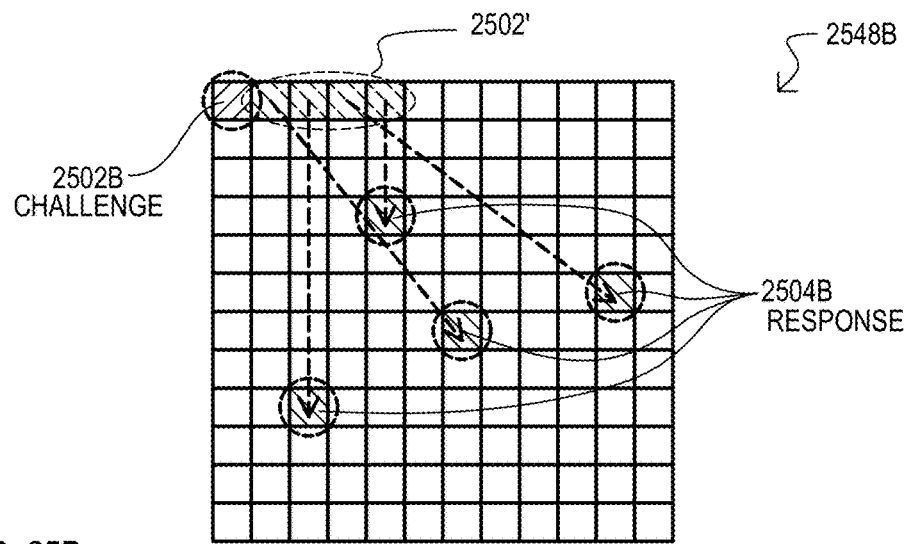

FIG. 25B shows operations in a PUF array 2548B according to another embodiment. A challenge 2402B can be applied that accesses data values 2502' in PUF array 2548B. Data values 2502' can be accessed by stepping across PUF array 2458 according to any of the embodiments described herein or equivalents. Further, data values 2502' can serve as seed values to a RNG to generate addresses that access the data for response value 2504B.

Figure 25C:
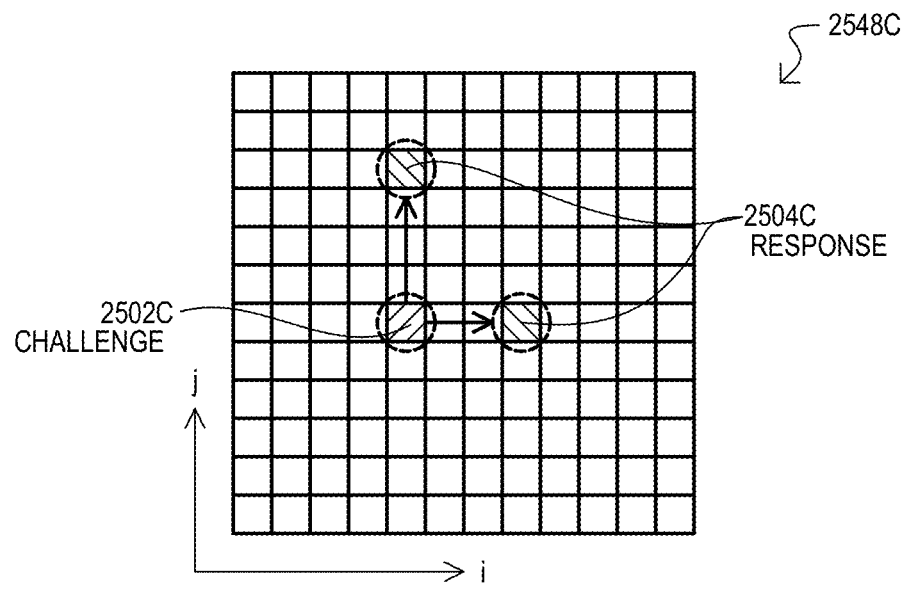

FIG. 25C shows operations in a PUF array 2548C according to another embodiment. A challenge 2402C can correspond to an address, as shown. Such an address can be applied as a seed to an RNG configured to generate addresses at random distances in different directions. For example, as shown in FIG. 25C, an output of a RNG can correspond to a physical or logical address in a first direction (e.g., i in FIG. 25C) of one of k response cells, and a subsequent output of a random number generator may correspond to a physical or logical address in a second direction (e.g., j in FIG. 25C) of a same response cell. Two outputs of a random number generators can therefore specify an address of a response cell 2504C.

In other embodiments, a complete address of one or more response cells may be obtained from a same output of a random number generator.

Figure 25D:
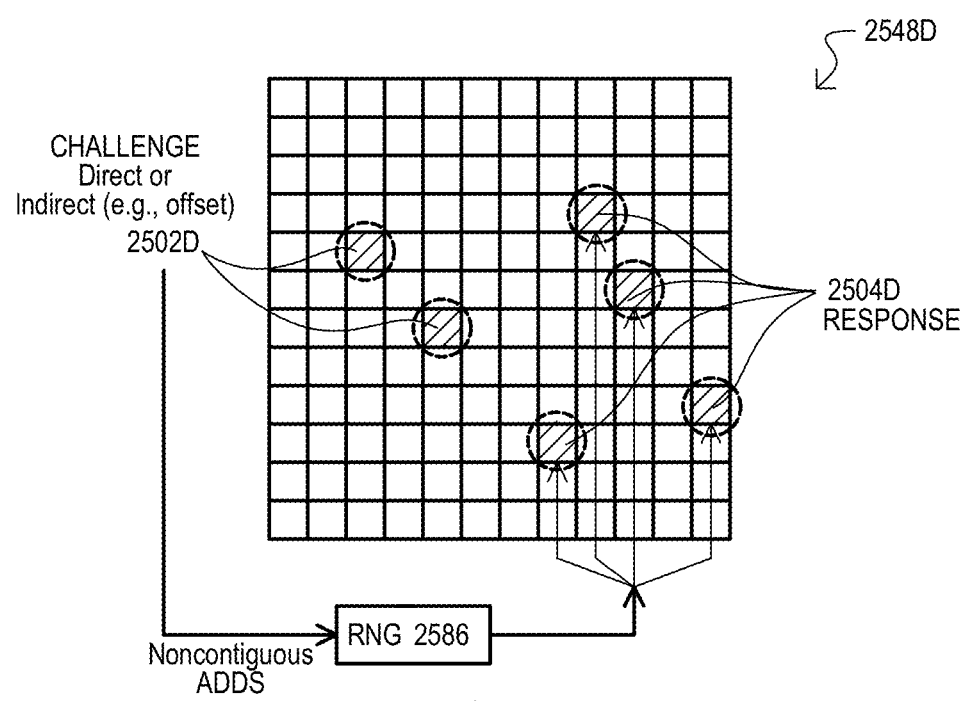

FIG. 25D shows operations in a PUF array 2548D according to another embodiment. A seed for a RNG used to select a response addresses may comprise data from noncontiguous addresses. For example, as shown in FIG. 25D, a challenge 2502D can have addresses that correspond to noncontiguous locations. Such noncontiguous addresses can be applied to RNG to generate addresses for response 2504D. It is noted that in a seed derived from noncontiguous addresses, more than one address may be skipped in between the selected addresses. As but one of numerous examples, a number of cells to be skipped may be specified in a challenge.

Just as response addresses can be generated at predetermined distances/locations from a challenge address (examples shown in FIGS. 19A/B, 23A to 23F), so may RNG seed values be generated from a challenge address. Thus, a challenge may include a physical or logical direction from which cells are selected to form a seed for a RNG that is used to generate a response address from a PUF Array.

Figure 23D:
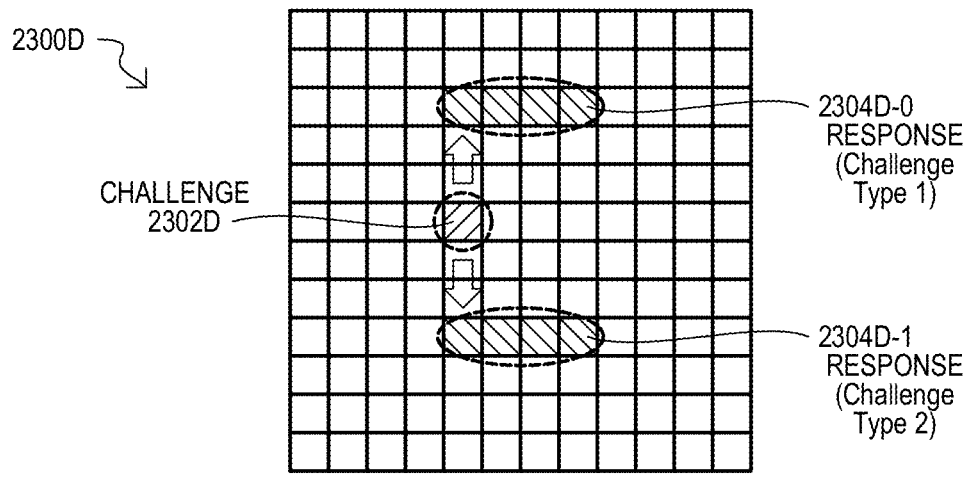

For example, a challenge beginning with a '0' may indicate that a seed comprises cells selected in a vertical direction from an address specified in a challenge, whereas a challenge beginning with a '1' may indicate that a seed comprises cells selected in a horizontal direction from an address specified in a challenge (see for example FIG. 23D).

Figure 23E:
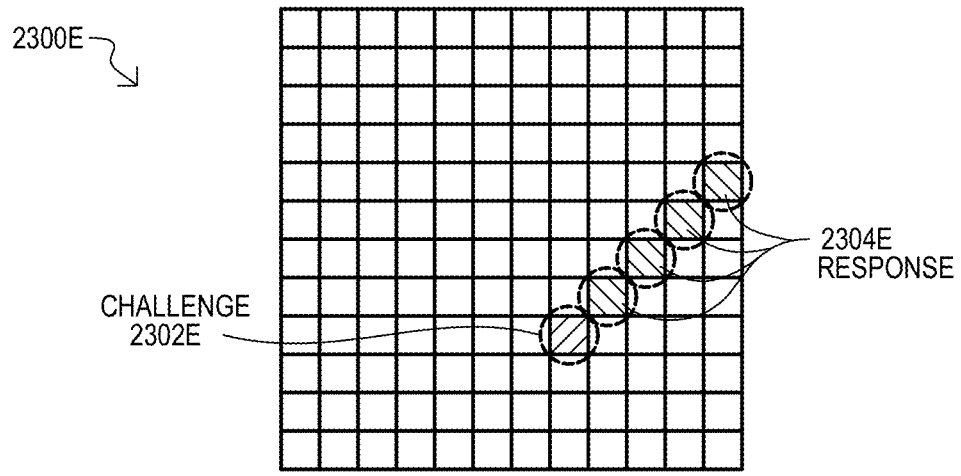

As another example, a challenge may indicate an angle that is not vertical or horizontal from which cells used to construct a seed are to be selected (see for example FIGS. 19B, 23E).

Figure 23F:
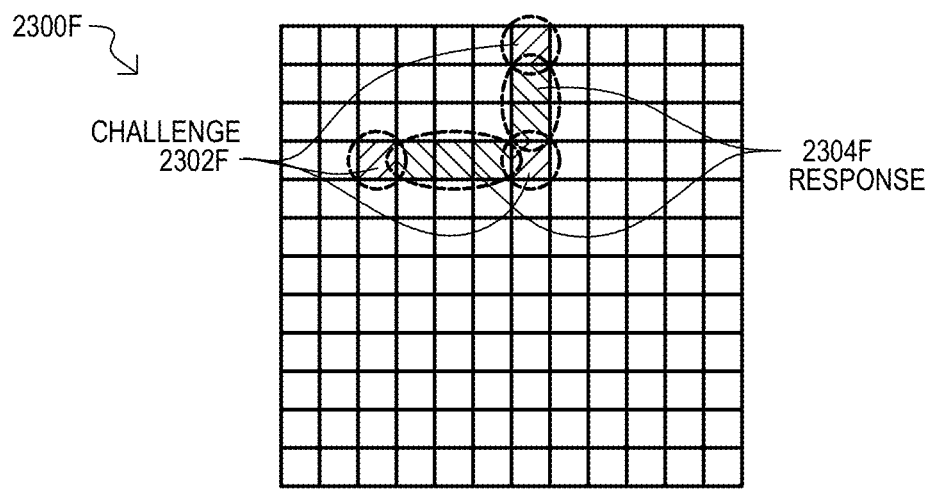

A challenge may specify "vertex" addresses between which cells are used to construct a seed are to be selected (see for example FIG. 23F).

An output from a RNG seeded by all or a portion of a challenge, or a data value accessed by a challenge, can be used to select any or all of the of the following:

1. a logical or physical direction from which cells are selected to form a response. Such directions may include horizontal, vertical, non-horizontal, non-vertical, and the like;

2. addresses which are logically or physically noncontiguous in one direction, such that a response can be constructed from data stored in cells at such addresses; or 3 addresses which are logically or physically noncontiguous in more than one direction, such that a response is constructed from data stored in cells at such addresses.

As described herein, hash arrays can be created with random values which can be transferred into another array to form a PUF array. In some embodiments, a hash array can be manufactured with corresponding PUF devices.

Figure 26A:
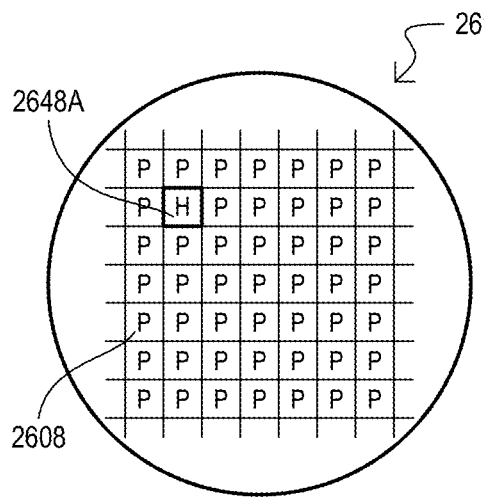
FIGS. 26A and 26B are diagrams showing the fabrication of integrated circuits (ICs) with hash arrays and PUF arrays on the same wafer according to embodiments.

FIG. 26A is a diagram showing a semiconductor wafer 2696A on which devices are manufactured. Wafer 2696A can include a hash array 2648A. In the embodiment shown, wafer 2696A can include a number of PUF arrays (one shown as 2608). Hash array 2648A can be created according to any of the embodiments herein, and random values of hash array 2648A can be transferred into some or all PUF arrays (e.g., 2608).

Figure 26B:
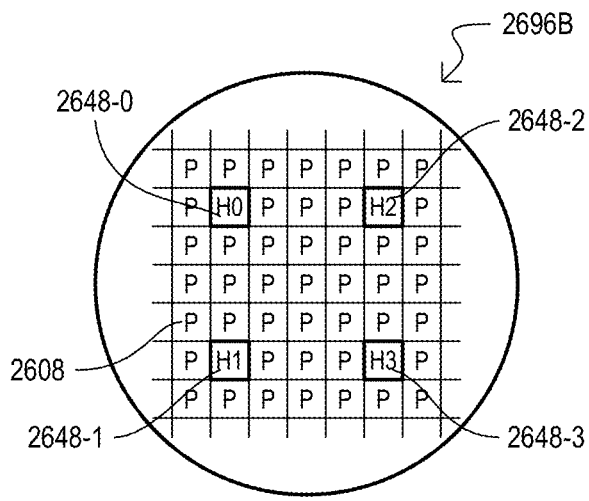

FIG. 26B is a diagram showing a semiconductor wafer 2696B that can include multiple hash arrays 2648-0 to -3. A wafer 2696B can also include a number of PUF arrays (one shown as 2608). Hash arrays 2648-0-3 can be created according to any of the embodiments herein. Random values of hash arrays 2648-0 to -3 can be transferred into some or all PUF arrays (e.g., 2608).

Figure 27A:
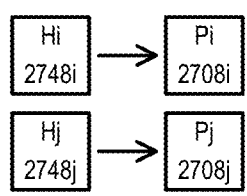
FIGS. 27A to 27C are diagrams showing how hash arrays can be used to form PUF arrays according to embodiments.
Figure 27B:
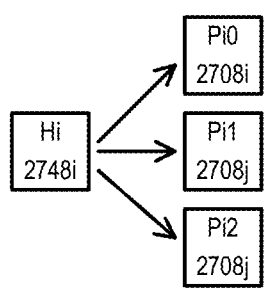
Figure 27C:
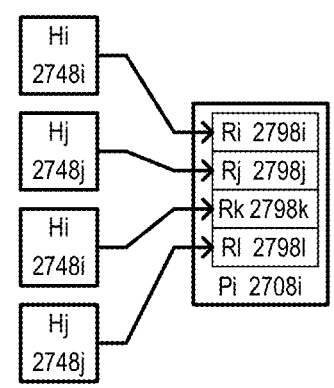

Hash arrays values can be transferred to PUF arrays in any suitable manner. FIGS. 27A to 27C show transfer operations according to particular embodiments. FIG. 27A shows an arrangement in which values of one hash array 2748*i/j* can be transferred to one PUF array 2708*i/j*, respectively. FIG. 27B shows an arrangement in which values of one hash array 2748*i* can be transferred to multiple PUF arrays 2708*i*0/1/2. FIG. 27C shows an arrangement in which values of different hash arrays 2748*i/j/k/l* can be transferred to different portions 2798*i/j/k/l*, respectively, of the same PUF array 2708*i*.

Accordingly, in embodiments, N hash arrays may be used to prepare M PUFs, where N=1, N>M or N<M. In specific embodiments, one die (i.e., IC substrate) can contain one hash array and one PUF Array, and the one hash array can be used to prepare the one PUF Array.

According to embodiments, PUF arrays can be prepared from hash arrays utilizing a key. A key can control how data is transferred from a hash array to the PUF array. A key can thus establish variation in PUF arrays created with a same hash array and/or provide additional variation in PUF array values. Keys can control data transfers between a hash array and PUF array in any suitable fashion, including but not limited to: determining which cells from a hash array are copied into a PUF array and/or in what order cells are copied, including methods and operations as disclosed herein and equivalents. In some embodiments, every PUF array created from a hash array cab have a different key. In other embodiments, a same key may be used for more than one PUF array.

Figure 28A:
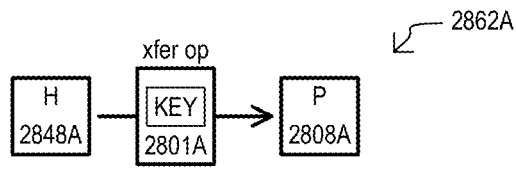
FIGS. 28A to 28E are diagrams showing how a key value can be generated and/or used to create a PUF array from a hash array according to embodiments.

FIG. 28A shows an operation 2862A for transferring data from a hash array 2848A to a PUF array 2808A. A key 2801A can control how such a data transfer occurs.

Figure 28B:
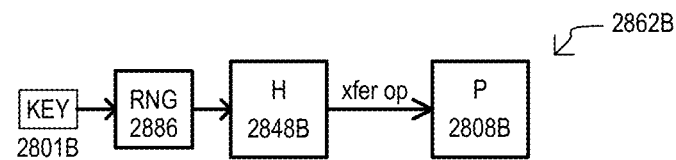

FIG. 28B shows an operation 2862B for transferring data from a hash array 2848B to a PUF array 2808B according to one embodiment. All or a portion of a key 2801B can serve as a seed value for a RNG 2886. Resulting random values from RNG 2886 can be used to select cells from a hash array 2848B. Selected cells from hash array 2848 can be used to establish logic values in PUF array 2808B according to any of the embodiments described herein, or equivalents.

Keys can be selected in any suitable fashion. For example, keys can be established by a manufacturer through random number generating algorithms, or the like. However, keys can be derived from a production process as well.

Figure 28C:
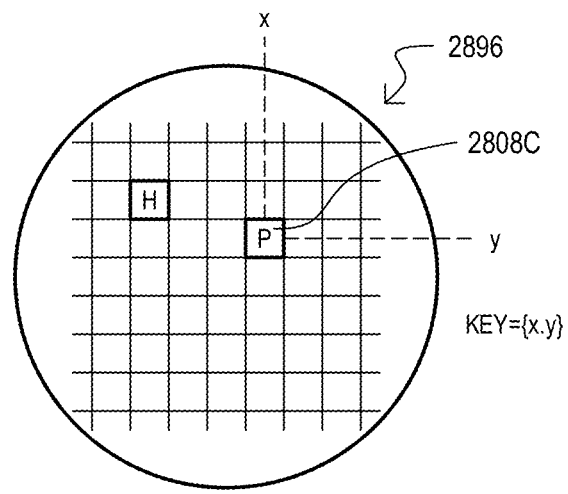

FIG. 28C shows how a PUF array position on a wafer can be used as all or a portion of a key value. A PUF array 2808C can have a position on a wafer defined by an x-coordinate (x) and a y-coordinate (y). Such values can be included in key value (e.g., KEY={x.y}). Of course, operations could be performed on coordinate values as well.

Figure 28D:
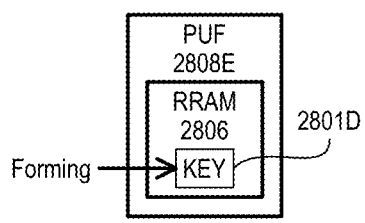

FIG. 28D shows an arrangement in which a key value can be generated on-chip (i.e., on the IC that contains the PUF array). FIG. 28D shows a PUF IC 2808D having an RRAM array 2806. A forming operation can be applied to RRAM cells in RRAM array 2806. Such a forming operation can be configured to form approximately 50% of the cells used for a key to which it is applied, as described herein and equivalents. That is, a forming operation can create key 2801D. Resistance states of bits making up key 2801D can be subsequently reinforced.

Once a key (e.g., 2801D) is created, it can be stored on-chip and/or external to the PUF array device. In the latter case, a key can be stored in any suitable nonvolatile fashion, including but not limited to NVM cells, such as RRAM, flash, MRAM, OTP, mask ROM, SONOS, phase change memory cells. In the former case, a manufacturer may retain a database of key values matched with chip ID values (stored and know by each PUF array IC).

Figure 28E:
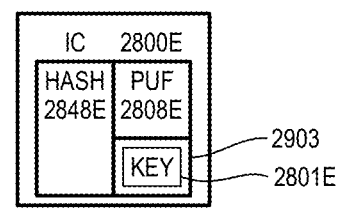

FIG. 28E is a block diagram of a PUF device 2800E that includes a hash array 2848E, corresponding PUF array 2808E, and a key value 2801E. Key value 2801E can be stored in nonvolatile circuits 2903 which may, or may not, be portions of hash array 2848E or PUF array 2808E. In some embodiments, data in hash array 2848E can be destroyed after PUF array 2808E is created.

A process of creating PUF devices for authentication purposes according to an embodiment will now be described with reference to FIGS. 29A to 29D.

Figures 29A, 29B, 29C:
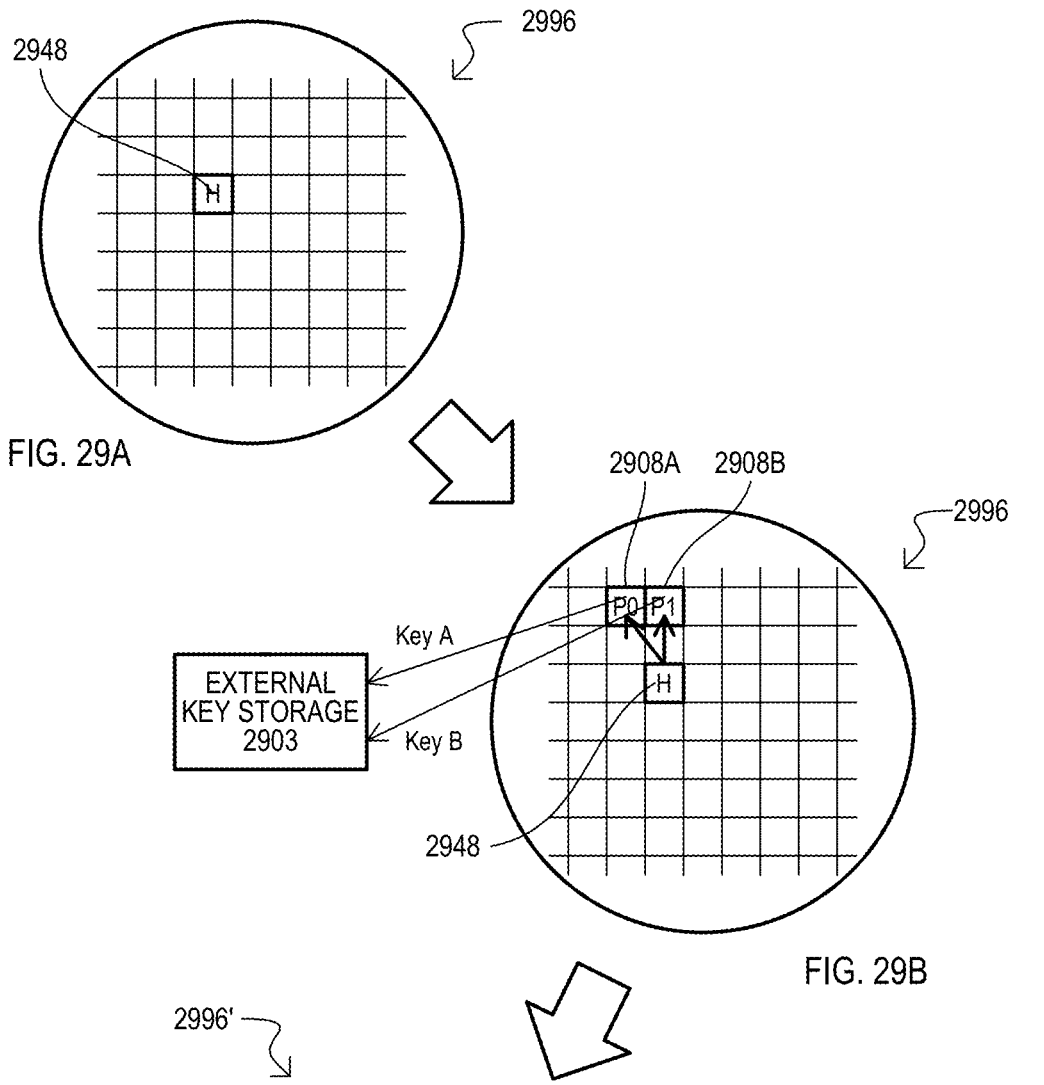
FIGS. 29A to 29D are diagrams showing how hash arrays, PUF arrays and keys can be fabricated and used in an authentication process according to embodiments.

Referring to FIG. 29A, a hash array 2948 can be created on a wafer 2996. In some embodiments this can include forming an RRAM array with associated access circuits, and then applying forming conditions to the RRAM as described herein or equivalents.

Referring to FIG. 29B, a hash array 2948 can be used to prepare PUF arrays (two shown as 2908A/B). PUF arrays 2908A/B can be RRAM arrays in different integrated circuits. The corresponding integrated circuits can have any other suitable functions. As but a few of many examples, such integrated circuits can be memory circuits (e.g., EPROM), microcontrollers, communication circuits, processors, etc. In some embodiments, keys (Key A, Key B) for PUF arrays 2908A/B can retained in external storage 2903. However, as noted herein, keys (Key A, Key B) can be stored in the IC devices corresponding to their PUF array 2908A/B.

Referring to FIG. 29C, a wafer 2996' can be diced to create individual ICs (i.e., dice or chips). Individual ICs can be placed in products. Thus, one product 2900A can include PUF array 2908A, while another product 2900B can include PUF array 2908B. A hash array 2948 can be stored in a storage device 2905, for use in authentication processes. In some embodiments, the data of a hash array 2948 can be copied into storage device 2905. In other embodiments, hash array 2948 and PUF arrays 2908A/B can be created after wafer 2996 is diced.

Figure 29D:
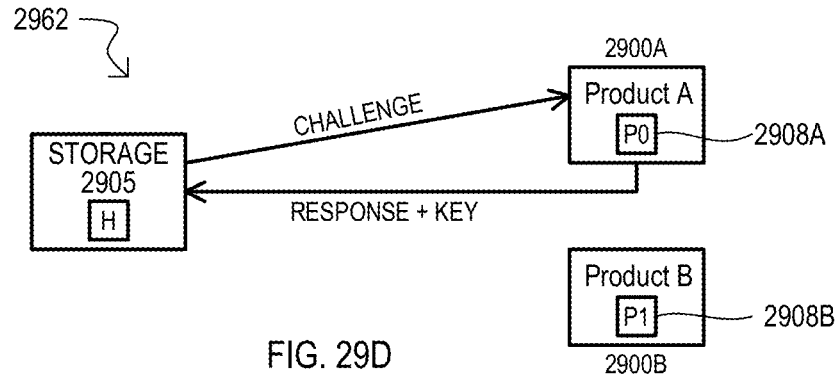

Referring to FIG. 29D, an authentication operation 2962 for the devices of FIG. 29C is shown in a diagram. PUF arrays 2908A/B can be used for authentication. According to embodiments, authentication can include one or more of the following steps:

a. A device that wants to check if a device is an authentic device (a Challenger) can create a challenge.

b. A Challenger can send a CHALLENGE to a PUF array (e.g., 2908A) (or a device of system including the PUF).

c. A PUF (e.g., 2908A) is utilized to create a RESPONSE to the received CHALLENGE.

d. The RESPONSE is sent to the Challenger, along with a KEY unique to the PUF array (e.g., 2908A) used to create the RESPONSE.

e. Using a received KEY and a hash array (2905) a Challenger can determine whether a received RESPONSE is the correct response to the issued CHALLENGE. A received KEY and hash array 2905 can be used to construct a copy of a PUF array associated with the received KEY (i.e., PUF array 2908A). From a PUF array copy, a response to the challenge may be created internally and compared to a received RESPONSE. If the internally created response matches the received RESPONSE, a PUF (e.g., 2908A) or a device or a system containing a PUF may be considered authenticated.

Figure 30:
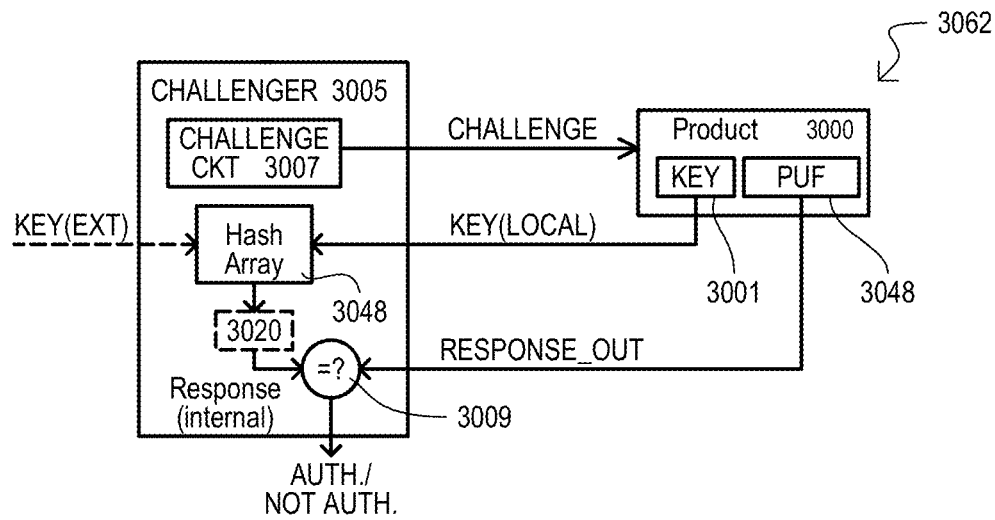
FIG. 30 is a diagram of an authentication system according to an embodiment.

FIG. 30 shows a system 3062 for executing an authentication operation like that described in FIG. 29D. A system 3062 can include a challenger device 3005 and an authenticated product 3000. A challenger device 3005 can include a challenge circuit 3007, a hash array 3048, a compare section 3009 and optionally, function block 3020. A challenge circuit 3007 can generate a CHALLENGE for application to product 3000. A hash array 3048 can include a hash array created according to any of the embodiments disclosed herein, or equivalents. A hash array 3048 can include ancillary circuits for accessing values and/or generating values in a particular manner according to a key value. Such key value can be received from a product (KEY(LOCAL)), or a source external to the challenger 3007 (KEY(EXT)). A compare section 3009 can compare an internal response to a response RESPONSE_OUT received from product 3000. Function block 3020 can execute predetermined operations on an output from hash array 3048. The same functions can be executed within product 3000 to generate its RESPONSE_OUT. All or a portion of the operations executed by function block 3020 can be configured with a key value.

The various circuits and portions of challenger 3005 can take the form of circuits, including programmable logic circuits and/or processor circuits executing instructions.

A product 3000 can include a key 3001 and a PUF array 3008. A key 3001 can be stored in nonvolatile circuits as described herein, or equivalents. In some embodiments, a product 3000 may not provide a key, but rather a device ID. A challenger 3005 can use a device ID to retrieve, generate, or otherwise acquire a key value for the hash array 3048. A PUF array 3008 can be created with the same values as hash array 3048.

According to embodiments, responses from a PUF array can be generated by reading bits in a PUF array in any of various directions. Portions of responses can be generated this way, or subsequent responses can be generated in this way. One example of such a PUF array is shown in FIG. 31.

Figure 31:
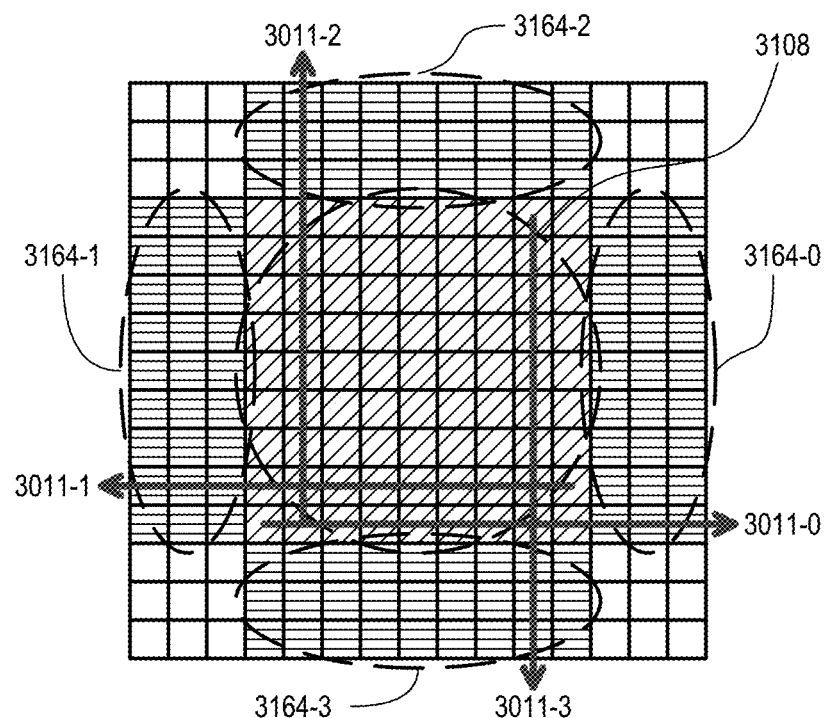
FIG. 31 is a diagram of a hash or PUF array having redundant locations to accommodate data values read in various different directions according to embodiments.

FIG. 31 shows a PUF array 3108 having storage locations for bit values of responses. Response values can be generated by reading bit values in various directions, shown in 3011-0 to -3. Directions can result in different types of codewords. For example, a right codeword (3011-0) (read in a left-to-right direction), a left code word 3011-1 (read in a right-to-left direction), an up codeword 3011-2 (read in a vertical up direction), and a down codeword 3011-3 (read in a vertical down direction).

According to embodiments, a PUF array 3108 can provide linear ECC bits adjacent to the PUF array 3108 (or considered part of the PUF array 3108). For example, region 3164-0 can include ECC bits which can support right codewords (and optionally left codewords). Region 3164-1 can include ECC bits which can support left codewords (and optionally right codewords). Region 3164-2 can include ECC bits which can support up codewords (and optionally down codewords). Region 3164-3 can include ECC bits which can support down codewords (and optionally up codewords).

While embodiments include establishing multiple values with each bit corresponding to a resistance state of an RRAM cell, in other embodiments values for a PUF array or hash array can be generated with a series of operations. Examples of such embodiments will now be described.

Figure 32:
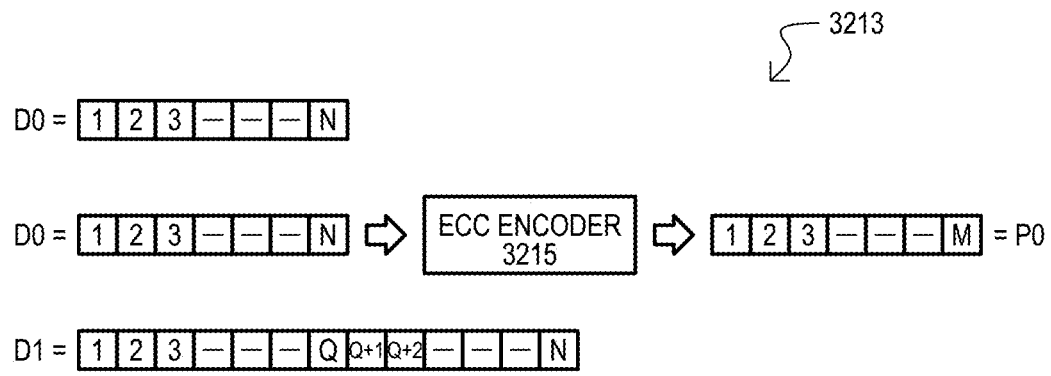
FIG. 32 is a sequence of diagrams showing methods of generating hash.

Referring to FIG. 32 a method 3213 can include the following:
1. Generate a binary data string D0 of length N.
2. Send D0 through a linear block ECC encoder to generate a binary parity string P0 of length M.
3. Replace Q≤M of the N data bits (of D0) with Q of the M parity bits to create a new data string D1 of length N.
4. Repeat steps 2 & 3 to obtain as many parity strings (Pi) as desired.
5. The Pi and/or Di values can have characteristics similar to those of a binary string whose elements (1s and 0s) are selected randomly. Such characteristics can include approximately 50/50 of 1s and 0s, low repeat rates (many cycles would have to be executed before a newly obtained Pi is the same as a previous Pi), and past and future strings cannot be easily predicted from knowledge of a given string. Accordingly, such values can be used to populate a PUF array.

It is also noted that predicting a Pi value can be especially difficult if the seed value (i.e., D0) has been destroyed.

According to embodiments, a value D0 can be derived from RRAM cells as described herein (e.g., a string of essentially formed/unformed cells). Further, the value D0 can be destroyed after use to generate Pi values (e.g., by forming all unformed cells, programming all cells, erasing all cells).

It is understood that FIG. 32 shows but one example of a code generation method according to an embodiment. For example, alternate embodiments can use an ECC decoder instead of an ECC encoder. Further, to create a new data string Di+1, a different portion of Di can be replaced with Pi (i.e., not just the leftmost bits as shown in FIG. 32). In another alternate embodiment, Di can be used as output values instead of Pi. ECC encoders and decoders may utilize any suitable encoding technique, including but not limited to: Hamming, BCH, or Reed-Solomon.

FIG. 33 is a diagram of a system 3371 according to an embodiment. A system 3371 can include one or more PUF devices 3300 and a cryptographic system 3373. A PUF device 3300 can be a PUF device according to any of the embodiments disclosed herein, or equivalents. Challenges 3302 can be applied to the PUF device to generate responses 3304 which can serve as keys in cryptographic system 3373. If a system 3371 includes a PUFs like those of FIGS. 1C to 2D, a system 3371 can generate a large number of keys with relatively limited circuit size.

Embodiments can include any suitable array architecture that provides access to cells in response to digital input values. An example of one particular architecture is shown in FIG. 34.

FIG. 34 shows a PUF 3400 according to an embodiment. A digital challenge 3402 can be applied to a decoder circuit 3416, which can select a word line (WL0 to WLn) in an RRAM cell array 3406. Selection of a word line can connect a row of memory cells (one memory cell shown as 3408-$i$) to bit lines (BL0 to BLm). Each memory cell (e.g., 3408-$i$) can include one or more RRAM elements having a resistance which can vary as described herein, or an equivalent. Compare/logic circuits 3424 can obtain digits for a digital response 3404 according to any of the approaches shown herein or equivalents, including with or without the use of a verify resistance Rv and/or with or without a determination of a word line address (WL ADD), which can be provided by decoder circuits 3402 (or alternatively by a bit value (e.g., MSB) of an applied challenge 3402.

PUF arrays and/or hash arrays according to embodiments herein can be formed using any suitable technology that can present an unpredictable variability in resistance. As but a few examples, embodiments may include cells selected from: conductive bridging random access memory type cells (e.g., CBRAM), subquantum conductive bridging memory cells, phase change memory cells (PCM), correlated electron memory cells (e.g., CeRAM), valence change memory cells (e.g., VCMO), anti-fuse memory cells, one time programmable memory cells (e.g., OTP), or multiple time programmable memory cells (e.g., MTP).

Embodiments can include any of various resistance change memory cells (e.g., RRAM, ReRAM, and the like). Such resistance change memory cells can rely on any of various resistance change mechanisms, including but not limited to: cells whose resistance change results from a filamentary physical mechanism, cells whose resistance change results from a physical mechanism operating at an interface between material layers, or cells whose resistance change results from a physical mechanism operating on the bulk of a material layer.

FIG. 35 is a cross sectional view of one particular RRAM element 3541 that can be included in embodiments. An RRAM element 3541 can be programmable between different resistance states, and in some embodiments, can provide an essentially random variation in states when subject to predetermined electrical conditions (e.g., forming conditions). An RRAM element 3541 can include one or more memory layers 3545 formed between a first electrode (e.g., cathode) 3547 and a second electrode (e.g., anode) 3543. By application of electric fields, a resistance of memory layer(s) 3545 can be altered. RRAM element 3541 can be formed above a substrate 3549 of an integrated circuit device. In some embodiments, such RRAM elements 3541 can be easily integrated into an existing fabrication process, being formed above one or more metallization/interconnect layer. Thus, a PUF or pseudo PUF as described herein can be advantageously easy to add to a device, as the RRAM elements do not occupy substrate area.

FIG. 36A shows one example of a RRAM memory cell 3608A that can be included in embodiments. RRAM memory cell 3608A can include an RRAM element 3641. RRAM element 3641 can be a two-terminal element having one terminal connected to a word line WL and another terminal connected to a bit line BL (i.e., a cross-point type array). RRAM element 3641 can take the form of any suitable programmable resistance structure, including that shown in FIG. 37.

FIG. 36B shows another example of a RRAM memory cell 3608B that can be included in embodiments. RRAM memory cell 3608B can include an RRAM element 3641 and an access device 3649. RRAM element 3641 can take the form of that shown in FIG. 36A and can have one terminal connected to access device 3649 and another terminal connected to node 3651, which may, or may not be common to other RRAM elements (i.e., a plate). An access device 3649 can be a three terminal device (e.g., transistor) having a control terminal connected to a word line WL, one current path terminal connected to a bit line BL, and another current path terminal connected to RRAM element 3641.

FIG. 37 shows examples of alteration voltages (Valter+, Vlater−) and/or alteration currents (Ialter+ and Ialter−) that can be applied to two terminal RRAM elements to alter or establish a resistance distribution as described herein. It is understood that a same voltage/current applied to different RRAM elements can result in RRAM elements having resistance values that can vary in a random or pseudorandom fashion.

It should be appreciated that reference throughout this description to "one embodiment" or "an embodiment" means that a particular feature, structure or characteristic described in connection with the embodiment is included in at least one embodiment of an invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

It is also understood that other embodiments of this invention may be practiced in the absence of an element/step not specifically disclosed herein.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

What is claimed is:

1. A method, comprising:
applying forming electrical conditions to at least some of a plurality of programmable resistive elements of a hash array to create a resistance distribution in the elements that varies according to at least manufacturing variations in the elements;
forming a physically unclonable function (PUF) array of essentially random values from the resistive elements of the hash array based on the resistance distribution of the elements, including
determining a logic state of at least some of the elements of the hash array based on the resistance of the elements of the hash array, and
copying the logic states of the elements of the hash array to memory cells of at least one memory array to form the PUF array; and
applying binary challenge values to the PUF array to select a plurality of the random values.

2. The method of claim 1, wherein:
applying the forming electrical conditions is selected from the group of: applying electrical conditions to newly manufactured elements; and applying electrical conditions to elements set to one resistance state that tend to shift the elements to another resistance state.

3. The method of claim 1, wherein:
the logic state of the elements comprises m-bits; and
copying the logic state includes writing n-bits into the memory cells of the at least one memory array for each m-bits of the hash array;
m and n are at least one; and
n is selected form a value equal to, less than, or greater than m.

4. The method of claim 1, wherein:
the memory cells of the PUF array also include programmable resistive memory elements.

5. The method of claim 1, wherein:
the hash array has a location selected from: a same memory cell array as the PUF array; a different memory cells array than the PUF array; a same integrated circuit device as the PUF array; and a different integrated circuit device than the PUF array.

6. The method of claim 1, wherein:
copying the logic states of the hash array elements includes copying the logic states of the hash array to a plurality of other memory circuits to form a plurality of PUF arrays.

7. The method of claim 1, wherein:
applying the forming electrical conditions includes
sensing a resistance of memory element
- if the sensed resistance is in a one range, applying the forming conditions to the element, and
- if the sensed resistance is in another range, not applying the forming conditions to the element.

* * * * *